US012670534B2

(12) United States Patent
Olenick

(10) Patent No.: US 12,670,534 B2
(45) Date of Patent: *Jun. 30, 2026

(54) METHOD AND SYSTEM FOR CURRICULUM MANAGEMENT SERVICES

(71) Applicant: Michael Olenick, Allentown, PA (US)

(72) Inventor: Michael Olenick, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,650

(22) Filed: Feb. 16, 2024

(65) Prior Publication Data

US 2024/0233056 A1 Jul. 11, 2024

Related U.S. Application Data

(63) Continuation of application No. 14/866,935, filed on Sep. 26, 2015, now Pat. No. 11,908,028, which is a continuation-in-part of application No. 14/659,562, filed on Mar. 16, 2015, now abandoned.

(60) Provisional application No. 61/954,553, filed on Mar. 17, 2014.

(51) Int. Cl.
| | |
|---|---|
| *G06Q 50/20* | (2012.01) |
| *G06F 3/01* | (2006.01) |
| *G06F 3/04842* | (2022.01) |
| *G06F 3/04847* | (2022.01) |
| *G06F 16/9535* | (2019.01) |

(52) U.S. Cl.
CPC ......... *G06Q 50/2053* (2013.01); *G06F 3/017* (2013.01); *G06F 3/04842* (2013.01); *G06F 3/04847* (2013.01); *G06F 16/9535* (2019.01)

(58) Field of Classification Search
CPC . G06Q 50/2053; G06F 16/9535; G06F 3/017; G06F 3/04842; G06F 3/04847

USPC .......................................................... 434/322
See application file for complete search history.

(56) References Cited

U.S. PATENT DOCUMENTS

| | | | |
|---|---|---|---|
| 6,988,138 B1 | 1/2006 | Alcorn et al. | |
| 7,362,997 B2 | 4/2008 | Hartenberger | |
| 8,620,831 B1 | 12/2013 | Adams | |
| 8,764,454 B1 | 7/2014 | Turner | |
| 2002/0178038 A1 | 11/2002 | Grybas | |
| 2004/0024776 A1* | 2/2004 | Moore ..................... G09B 5/00 707/999.102 |

(Continued)

OTHER PUBLICATIONS

Notice of Allowance dated Nov. 30, 2023 in U.S. Appl. No. 14/866,935, pp. 1-9.

(Continued)

*Primary Examiner* — Malina D. Blaise

(74) *Attorney, Agent, or Firm* — Byrne Poh LLP

(57) ABSTRACT

A method and system for providing curriculum management services. In an operation, a user may access curriculum management system from a computer terminal. A user may send information and/or commands to a processing module. A user may enter or update information stored in one or more databases. A user may select or be assigned one or more objectives from an objective dataset. An objective module may access one or more databases containing information from one or more objective datasets. Given an objective from an objective set, processing module may request a course dataset from a course module. Information regarding a user's pathways may be sent to a display module for viewing by the user.

15 Claims, 16 Drawing Sheets

(56) References Cited

U.S. PATENT DOCUMENTS

| | | | | |
|---|---|---|---|---|
| 2004/0197759 A1* | 10/2004 | Olson | ................ | G09B 7/02 |
| | | | | 434/322 |
| 2005/0096973 A1* | 5/2005 | Heyse | ............... | G06Q 10/105 |
| | | | | 705/320 |
| 2005/0114203 A1 | 5/2005 | Savitsky et al. | | |
| 2006/0036460 A1* | 2/2006 | Gibbons | ............ | G06Q 50/205 |
| | | | | 705/326 |
| 2006/0252021 A1 | 11/2006 | Watkins et al. | | |
| 2009/0197234 A1 | 8/2009 | Creamer et al. | | |
| 2009/0280462 A1* | 11/2009 | Yaskin | ............... | G09B 5/12 |
| | | | | 434/322 |
| 2009/0280463 A1* | 11/2009 | Yaskin | ............... | G09B 5/00 |
| | | | | 434/323 |
| 2011/0055035 A1 | 3/2011 | Koskay et al. | | |
| 2011/0055100 A1 | 3/2011 | Koskay et al. | | |
| 2012/0072361 A1* | 3/2012 | Bekerian | .......... | G06Q 10/1053 |
| | | | | 705/321 |
| 2013/0108997 A1* | 5/2013 | Wright | ............... | G06Q 30/08 |
| | | | | 434/236 |
| 2013/0164720 A1* | 6/2013 | Siimes | ............... | G06Q 10/1053 |
| | | | | 434/219 |
| 2014/0089219 A1* | 3/2014 | Mathews | .............. | G06Q 10/10 |
| | | | | 705/327 |
| 2015/0066612 A1 | 3/2015 | Karpoff et al. | | |
| 2016/0320931 A1* | 11/2016 | Kovacs | ............... | G06F 3/04886 |
| 2016/0320946 A1* | 11/2016 | Zhao | ................ | G06F 16/248 |
| 2022/0327648 A1* | 10/2022 | Jassal | ............... | G06Q 10/103 |
| 2022/0351296 A1* | 11/2022 | Costaceque-Cecchi-Dimegli | ....... | |
| | | | | G06Q 50/20 |

OTHER PUBLICATIONS

Office Action dated Jan. 1, 2021 in U.S. Appl. No. 14/866,935, pp. 1-30.

Office Action dated Mar. 14, 2022 in U.S. Appl. No. 14/866,935, pp. 1-53.

Office Action dated Apr. 22, 2020 in U.S. Appl. No. 14/866,935, pp. 1-26.

Office Action dated May 10, 2023 in U.S. Appl. No. 14/866,935, pp. 1-17.

Office Action dated Sep. 3, 2021 in U.S. Appl. No. 14/866,935, pp. 1-11.

Office Action dated Dec. 26, 2018 in U.S. Appl. No. 14/866,935, pp. 1-30.

* cited by examiner

200

Log in to a user profile — 205

Enter user information — 210

Select objectives — 215

Obtain objective requirements — 220

Obtain course information — 225

Determine objective pathways — 230

Display pathways — 235

Send user notifications — 240

Change user data? — 245

Yes

No

END

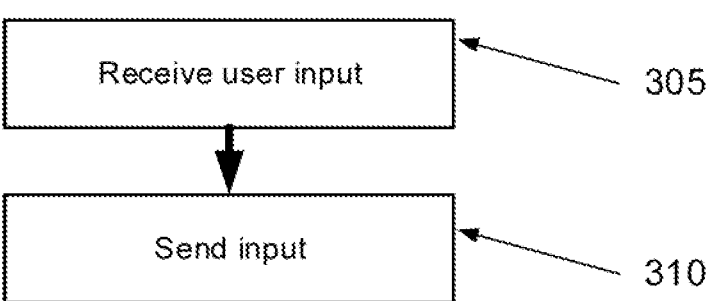
305
310
Fig. 3

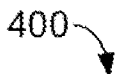
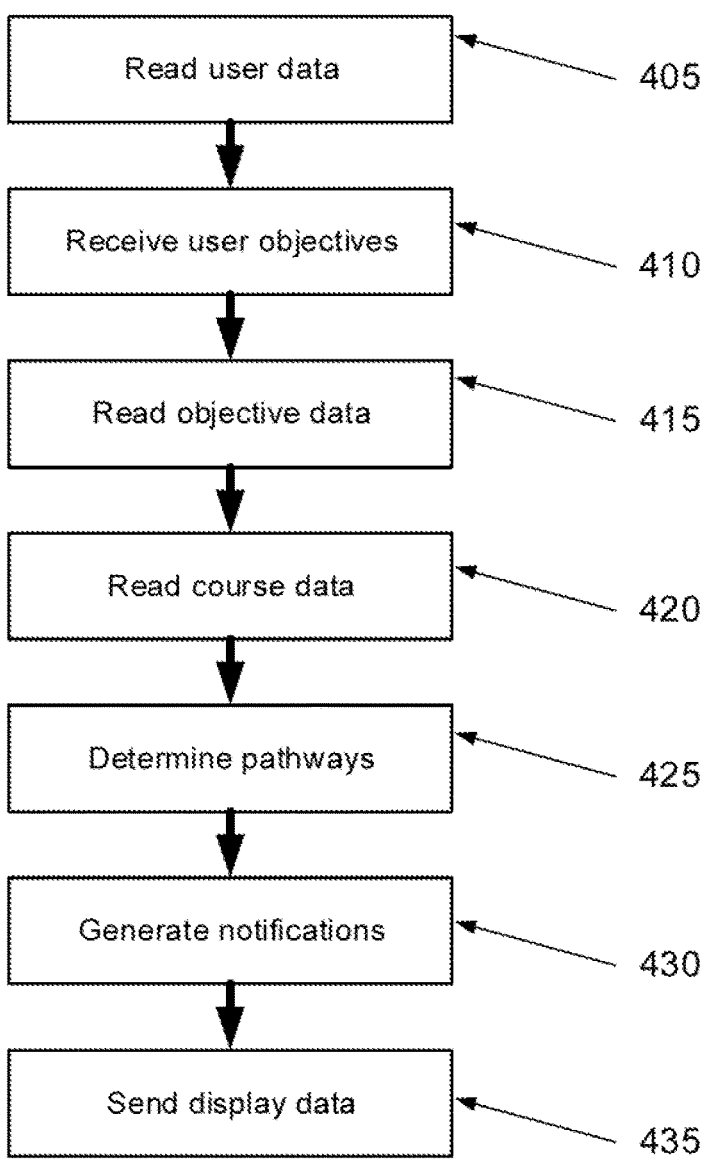
Fig. 4

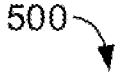
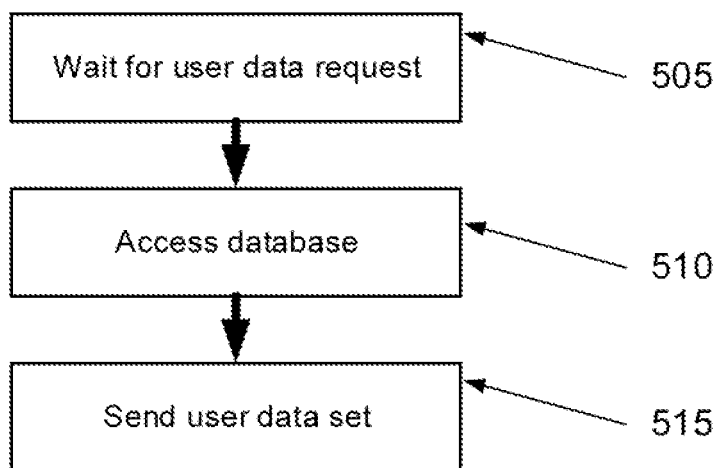
Wait for user data request          505
Access database          510
Send user data set          515
Fig. 5

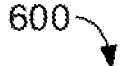
600
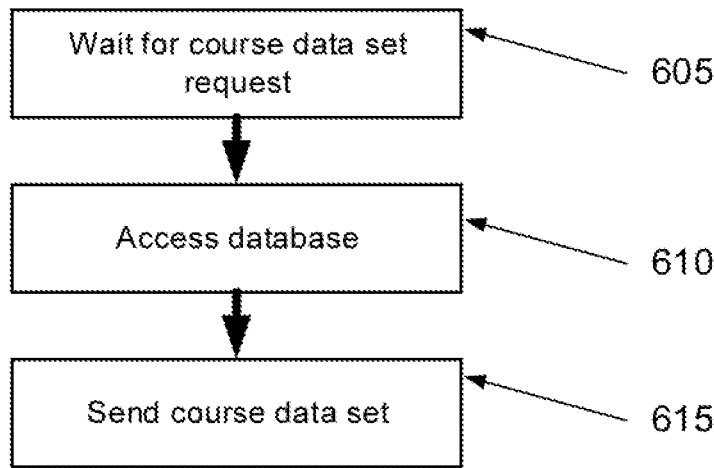
| | |
|---|---|
| Wait for course data set request | 605 |
| Access database | 610 |
| Send course data set | 615 |
Fig. 6

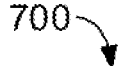
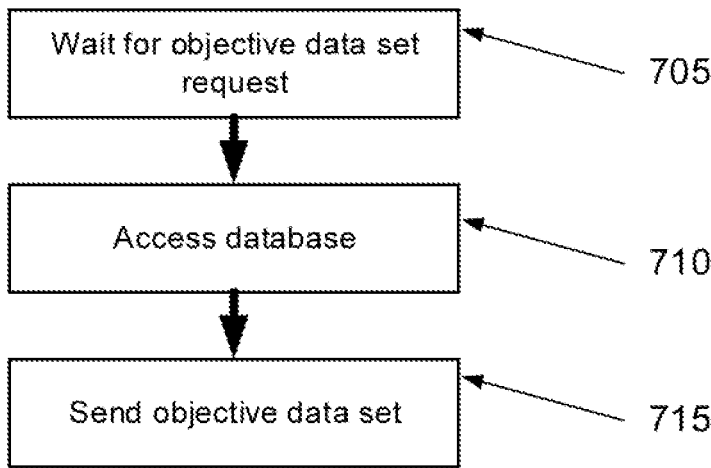
Fig. 7

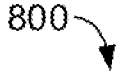
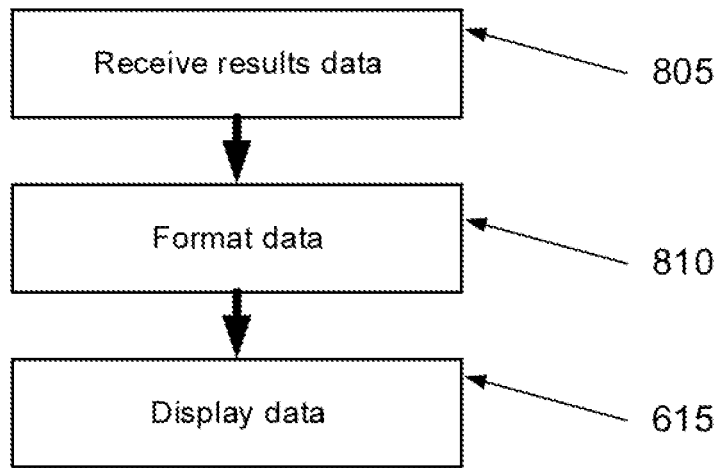
Fig. 8

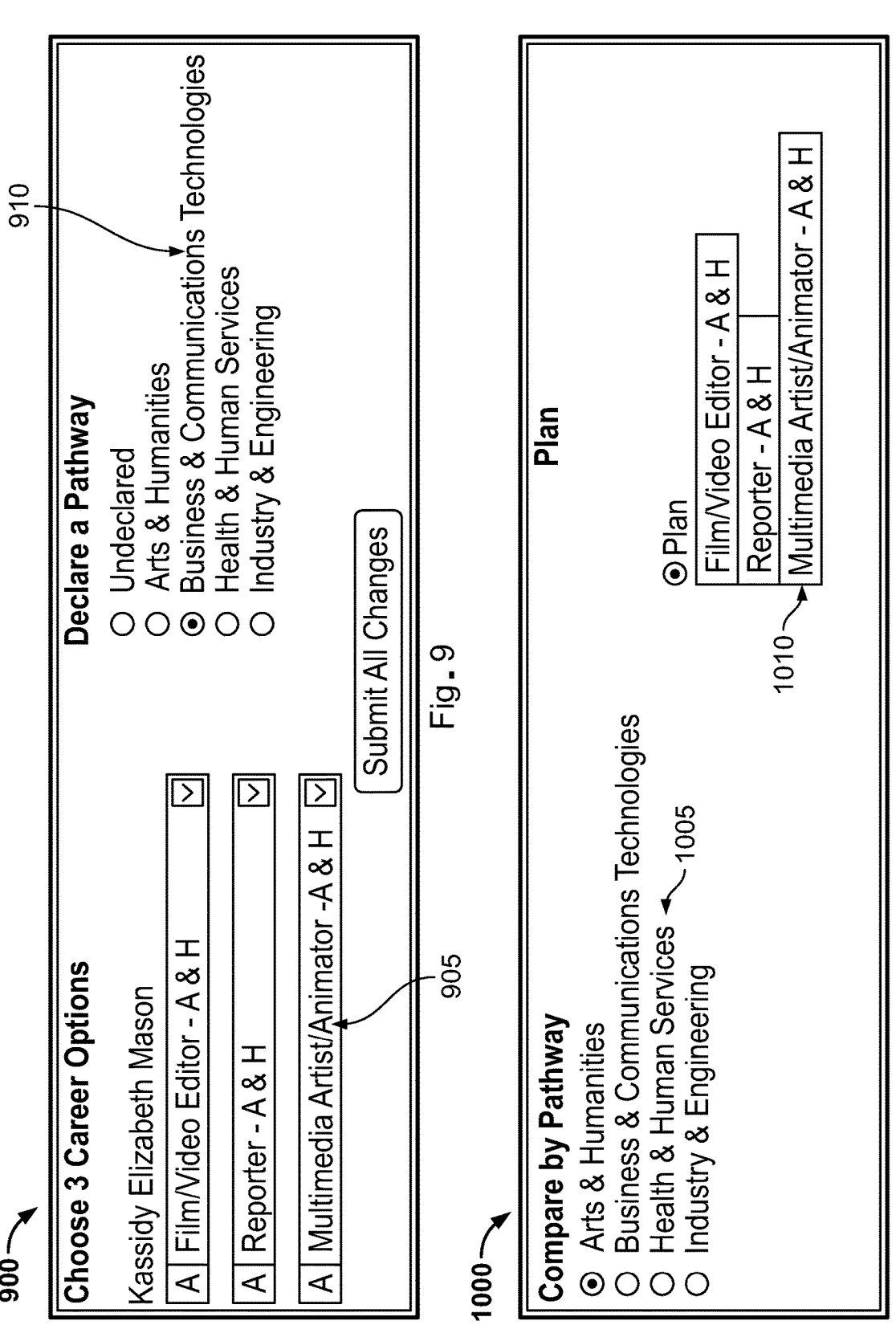

Choose 3 Career Options

Kassidy Elizabeth Mason

[A ▽] Film/Video Editor - A & H

[A ▽] Reporter - A & H

[A ▽] Multimedia Artist/Animator - A & H    — 905

900

910 — Declare a Pathway

○ Undeclared
○ Arts & Humanities
◉ Business & Communications Technologies
○ Health & Human Services
○ Industry & Engineering

[ Submit All Changes ]

Fig. 9

Compare by Pathway

◉ Arts & Humanities
○ Business & Communications Technologies
○ Health & Human Services    — 1005
○ Industry & Engineering

1000

Plan

◉ Plan

| Film/Video Editor - A & H |
| Reporter - A & H |
| Multimedia Artist/Animator - A & H |

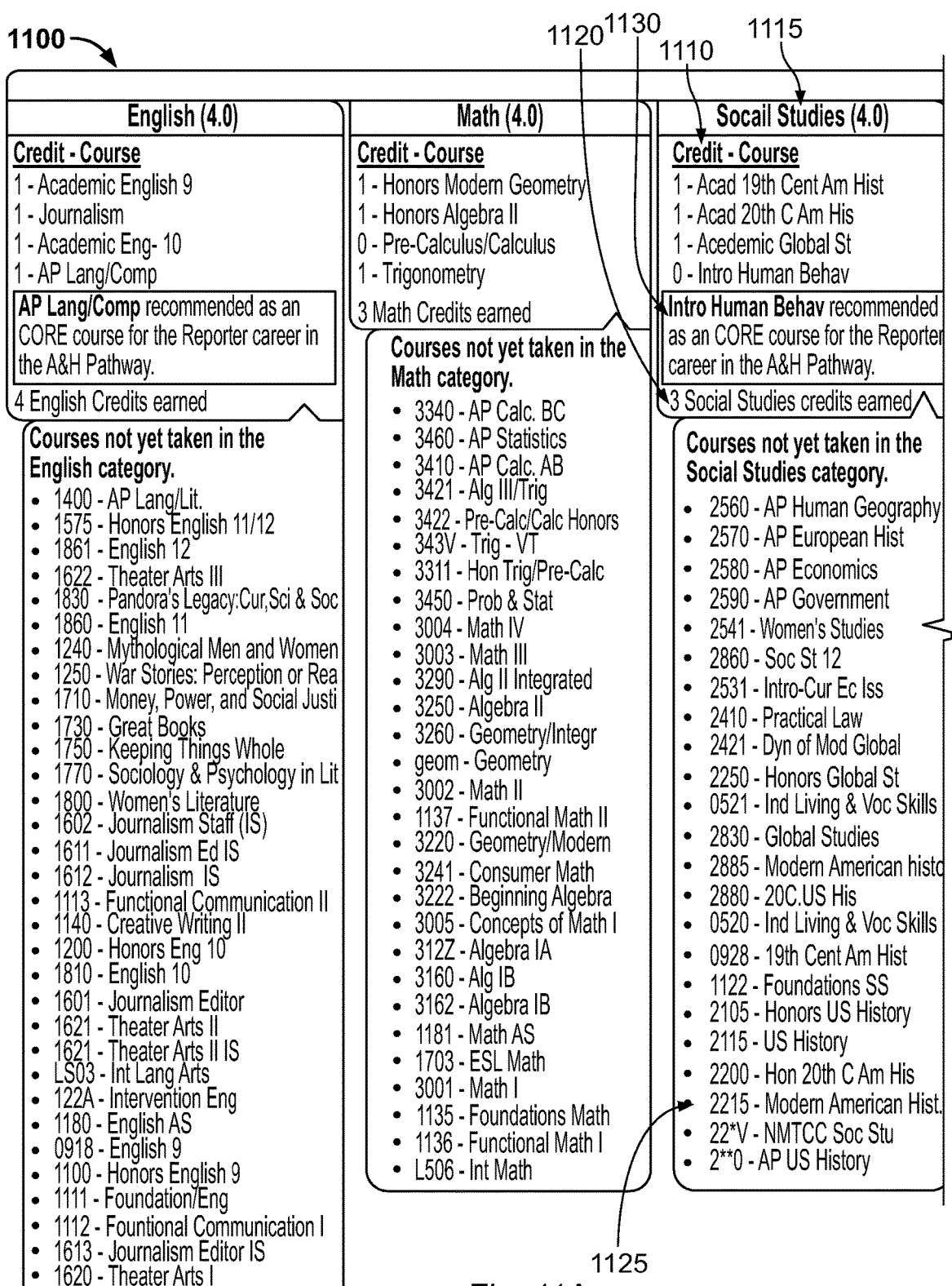

English (4.0)

Credit - Course
1 - Academic English 9
1 - Journalism
1 - Academic Eng- 10
1 - AP Lang/Comp AP Lang/Comp recommended as an CORE course for the Reporter career in the A&H Pathway.

4 English Credits earned

Courses not yet taken in the English category.
• 1400 - AP Lang/Lit.
• 1575 - Honors English 11/12
• 1861 - English 12
• 1622 - Theater Arts III
• 1830 - Pandora's Legacy:Cur,Sci & Soc
• 1860 - English 11
• 1240 - Mythological Men and Women
• 1250 - War Stories: Perception or Rea
• 1710 - Money, Power, and Social Justi
• 1730 - Great Books
• 1750 - Keeping Things Whole
• 1770 - Sociology & Psychology in Lit
• 1800 - Women's Literature
• 1602 - Journalism Staff (IS)
• 1611 - Journalism Ed IS
• 1612 - Journalism IS
• 1113 - Functional Communication II
• 1140 - Creative Writing II
• 1200 - Honors Eng 10
• 1810 - English 10
• 1601 - Journalism Editor
• 1621 - Theater Arts II
• 1621 - Theater Arts II IS
• LS03 - Int Lang Arts
• 122A - Intervention Eng
• 1180 - English AS
• 0918 - English 9
• 1100 - Honors English 9
• 1111 - Foundation/Eng
• 1112 - Fountional Communication I
• 1613 - Journalism Editor IS
• 1620 - Theater Arts I
• 1581 - Creative Writing

Math (4.0)

Credit - Course
1 - Honors Modern Geometry
1 - Honors Algebra II
0 - Pre-Calculus/Calculus
1 - Trigonometry 3 Math Credits earned Courses not yet taken in the Math category.
• 3340 - AP Calc. BC
• 3460 - AP Statistics
• 3410 - AP Calc. AB
• 3421 - Alg III/Trig
• 3422 - Pre-Calc/Calc Honors
• 343V - Trig - VT
• 3311 - Hon Trig/Pre-Calc
• 3450 - Prob & Stat
• 3004 - Math IV
• 3003 - Math III
• 3290 - Alg II Integrated
• 3250 - Algebra II
• 3260 - Geometry/Integr
• geom - Geometry
• 3002 - Math II
• 1137 - Functional Math II
• 3220 - Geometry/Modern
• 3241 - Consumer Math
• 3222 - Beginning Algebra
• 3005 - Concepts of Math I
• 312Z - Algebra IA
• 3160 - Alg IB
• 3162 - Algebra IB
• 1181 - Math AS
• 1703 - ESL Math
• 3001 - Math I
• 1135 - Foundations Math
• 1136 - Functional Math I
• L506 - Int Math

Socail Studies (4.0)

Credit - Course
1 - Acad 19th Cent Am Hist
1 - Acad 20th C Am His
1 - Acedemic Global St
0 - Intro Human Behav Intro Human Behav recommended as an CORE course for the Reporter career in the A&H Pathway.

3 Social Studies credits earned

Courses not yet taken in the Social Studies category.
• 2560 - AP Human Geography
• 2570 - AP European Hist
• 2580 - AP Economics
• 2590 - AP Government
• 2541 - Women's Studies
• 2860 - Soc St 12
• 2531 - Intro-Cur Ec Iss
• 2410 - Practical Law
• 2421 - Dyn of Mod Global
• 2250 - Honors Global St
• 0521 - Ind Living & Voc Skills
• 2830 - Global Studies
• 2885 - Modern American histd
• 2880 - 20C.US His
• 0520 - Ind Living & Voc Skills
• 0928 - 19th Cent Am Hist
• 1122 - Foundations SS
• 2105 - Honors US History
• 2115 - US History
• 2200 - Hon 20th C Am His
• 2215 - Modern American Hist.
• 22*V - NMTCC Soc Stu
• 2**0 - AP US History

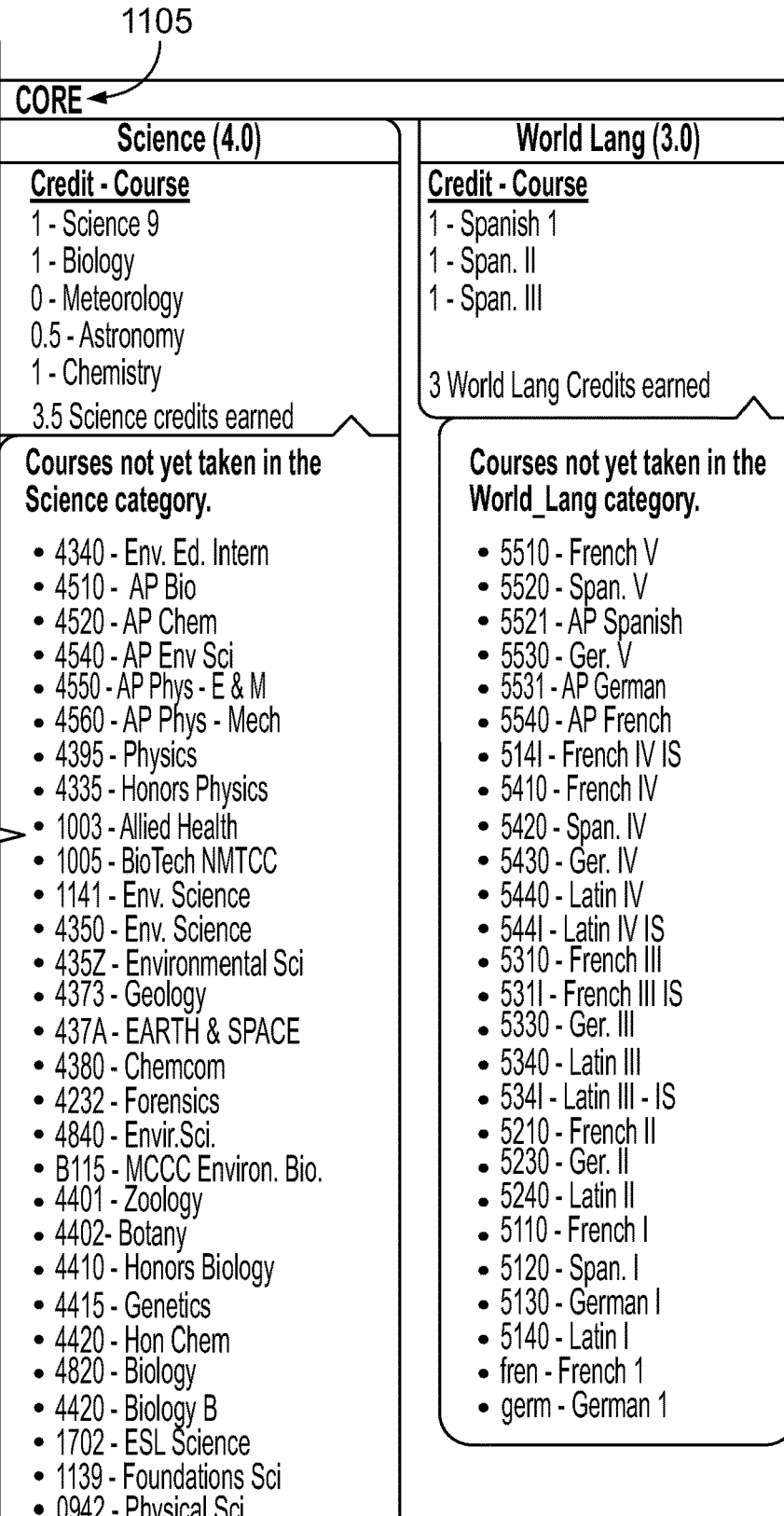

CORE

Science (4.0)

Credit - Course
1 - Science 9
1 - Biology
0 - Meteorology
0.5 - Astronomy
1 - Chemistry
3.5 Science credits earned Courses not yet taken in the Science category.

- 4340 - Env. Ed. Intern
- 4510 - AP Bio
- 4520 - AP Chem
- 4540 - AP Env Sci
- 4550 - AP Phys - E & M
- 4560 - AP Phys - Mech
- 4395 - Physics
- 4335 - Honors Physics
- 1003 - Allied Health
- 1005 - BioTech NMTCC
- 1141 - Env. Science
- 4350 - Env. Science
- 435Z - Environmental Sci
- 4373 - Geology
- 437A - EARTH & SPACE
- 4380 - Chemcom
- 4232 - Forensics
- 4840 - Envir.Sci.
- B115 - MCCC Environ. Bio.
- 4401 - Zoology
- 4402- Botany
- 4410 - Honors Biology
- 4415 - Genetics
- 4420 - Hon Chem
- 4820 - Biology
- 4420 - Biology B
- 1702 - ESL Science
- 1139 - Foundations Sci
- 0942 - Physical Sci.
- 0948 - Science 9

World Lang (3.0)

Credit - Course
1 - Spanish 1
1 - Span. II
1 - Span. III

3 World Lang Credits earned

Courses not yet taken in the World_Lang category.

- 5510 - French V
- 5520 - Span. V
- 5521 - AP Spanish
- 5530 - Ger. V
- 5531 - AP German
- 5540 - AP French
- 5141 - French IV IS
- 5410 - French IV
- 5420 - Span. IV
- 5430 - Ger. IV
- 5440 - Latin IV
- 5441 - Latin IV IS
- 5310 - French III
- 5311 - French III IS
- 5330 - Ger. III
- 5340 - Latin III
- 5341 - Latin III - IS
- 5210 - French II
- 5230 - Ger. II
- 5240 - Latin II
- 5110 - French I
- 5120 - Span. I
- 5130 - German I
- 5140 - Latin I
- fren - French 1
- germ - German 1

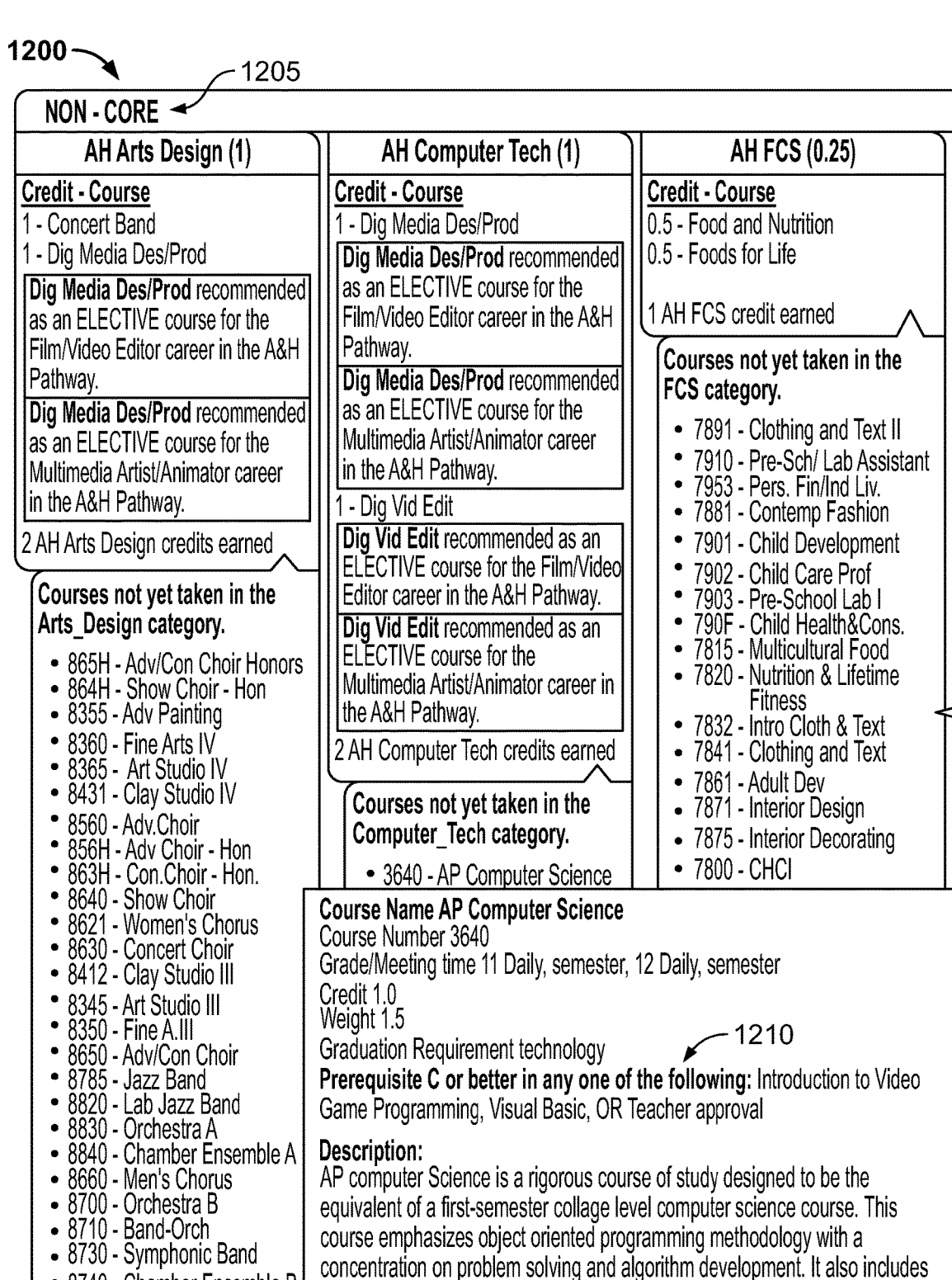

NON - CORE

| AH Arts Design (1) | AH Computer Tech (1) | AH FCS (0.25) |
|---|---|---|
| Credit - Course | Credit - Course | Credit - Course |
| 1 - Concert Band | 1 - Dig Media Des/Prod | 0.5 - Food and Nutrition |
| 1 - Dig Media Des/Prod | | 0.5 - Foods for Life |

AH Arts Design (1)

Credit - Course
1 - Concert Band
1 - Dig Media Des/Prod

Dig Media Des/Prod recommended as an ELECTIVE course for the Film/Video Editor career in the A&H Pathway.

Dig Media Des/Prod recommended as an ELECTIVE course for the Multimedia Artist/Animator career in the A&H Pathway.

2 AH Arts Design credits earned

Courses not yet taken in the Arts_Design category.

- 865H - Adv/Con Choir Honors
- 864H - Show Choir - Hon
- 8355 - Adv Painting
- 8360 - Fine Arts IV
- 8365 - Art Studio IV
- 8431 - Clay Studio IV
- 8560 - Adv.Choir
- 856H - Adv Choir - Hon
- 863H - Con.Choir - Hon.
- 8640 - Show Choir
- 8621 - Women's Chorus
- 8630 - Concert Choir
- 8412 - Clay Studio III
- 8345 - Art Studio III
- 8350 - Fine A.III
- 8650 - Adv/Con Choir
- 8785 - Jazz Band
- 8820 - Lab Jazz Band
- 8830 - Orchestra A
- 8840 - Chamber Ensemble A
- 8660 - Men's Chorus
- 8700 - Orchestra B
- 8710 - Band-Orch
- 8730 - Symphonic Band
- 8740 - Chamber Ensemble B
- 874H - Cham Ens - Hon

AH Computer Tech (1)

Credit - Course
1 - Dig Media Des/Prod

Dig Media Des/Prod recommended as an ELECTIVE course for the Film/Video Editor career in the A&H Pathway.

Dig Media Des/Prod recommended as an ELECTIVE course for the Multimedia Artist/Animator career in the A&H Pathway.

1 - Dig Vid Edit

Dig Vid Edit recommended as an ELECTIVE course for the Film/Video Editor career in the A&H Pathway.

Dig Vid Edit recommended as an ELECTIVE course for the Multimedia Artist/Animator career in the A&H Pathway.

2 AH Computer Tech credits earned

Courses not yet taken in the Computer_Tech category.

- 3640 - AP Computer Science

AH FCS (0.25)

Credit - Course
0.5 - Food and Nutrition
0.5 - Foods for Life

1 AH FCS credit earned

Courses not yet taken in the FCS category.

- 7891 - Clothing and Text II
- 7910 - Pre-Sch/ Lab Assistant
- 7953 - Pers. Fin/Ind Liv.
- 7881 - Contemp Fashion
- 7901 - Child Development
- 7902 - Child Care Prof
- 7903 - Pre-School Lab I
- 790F - Child Health&Cons.
- 7815 - Multicultural Food
- 7820 - Nutrition & Lifetime Fitness
- 7832 - Intro Cloth & Text
- 7841 - Clothing and Text
- 7861 - Adult Dev
- 7871 - Interior Design
- 7875 - Interior Decorating
- 7800 - CHCl

Course Name AP Computer Science
Course Number 3640
Grade/Meeting time 11 Daily, semester, 12 Daily, semester
Credit 1.0
Weight 1.5
Graduation Requirement technology

1210

Prerequisite C or better in any one of the following: Introduction to Video Game Programming, Visual Basic, OR Teacher approval

Description:
AP computer Science is a rigorous course of study designed to be the equivalent of a first-semester collage level computer science course. This course emphasizes object oriented programming methodology with a concentration on problem solving and algorithm development. It also includes the study of data structures, design, and abstraction. The curriculum will prepare the student to perform his or her best on the AP Computer Science exam.

Fig. 12A

AH Career Elec (5)

Credit - Course

1 - Concert Band

1 - Dig Media Des/Prod

| |
|---|
| Dig Media Des/Prod recommended as an ELECTIVE course for the Film/Video Editor Career in the A&H Pathway. |
| Dig media Des/Prod recommended as an ELECTIVE course for the Multimedia Artist/Animator career in the A&H Pathway. |

0.5 - Food and Nutrition 0.5 - Foods for Life

1 - TV Prod

| |
|---|
| TV Prod recommended as an ELECTIVE course for the Film/Video Editor career in the A&H Pathway. |
| TV Prod recommended as an ELECTIVE course for the Multimedia Artist/Animator career in the A&H Pathway. |

1 - TV Prod

| |
|---|
| TV Prod recommended as an ELECTIVE course for the Film/Video Editor career in the A&H Pathway. |
| TV Prod recommended as an ELECTIVE course for the Multimedia Artist/Animator career in the A&H Pathway. |

0 - TV Prod/Producer

| |
|---|
| TV Prod/Producer recommended as an ELECTIVE course for the Film/Video Editor career in the A&H Pathway. |
| TV Prod/Producer recommended as an ELECTIVE course for the Multimedia Artist/Animator career in the A&H Pathway. |

5 AH Career Elec credits earned

Courses not yet taken in the Career_Elec category.

- 8301 - Exploring Vis Arts
- 8310 - Art Studio I
- 8321 - Sculpture I
- 8322 - Sculpture 2
- 8330 - Art Studio II
- 8341 - Printmaking
- 8345 - Art Studio III

- 8785 - Jazz Band
- 8820 - Lab Jazz Band
- 8830 - Orchestra A
- 8840 - Chamber Ensemble A
- 4373 - Geology
- 1861 - English 12
- 2830 - Global Studies

Diploma Choices

Basic Diploma (28 Credits)

| Category | Requirement |
|---|---|
| English | Completed |
| Math | 1 credit needed |
| Social_Studies | 1 credit needed |
| Science | 0.5 credit needed |
| Arts_Design | Completed |
| Computer_Tech | Completed |
| FCS | Completed |
| Wellness | Completed |
| Wellness_Elec | Completed |
| PersFin_CareerExp | Completed |
| Grad_Proj | 0.5 credit needed |
| | |
| AH_Other_Elec | Completed |
| 25.5 current total credits | |

Pathway Diploma (29 Credits)

| Category | Requirement |
|---|---|
| English | Completed |
| Math | 1 credit needed |
| Social_Studies | 1 credit needed |
| Science | 0.5 credit needed |
| World_Lang | Completed |
| Arts_Design | Completed |
| Computer_Tech | Completed |
| FCS | Completed |
| Wellness | Completed |
| Wellness_Elec | Completed |
| PersFin_CareerExp | Completed |
| Grad_Proj | 0.5 credit needed |
| Intern | 0.5 credit needed |
| Career_Elec | Completed |
| AH_Other_Elec | Completed |
| 25.5 current total credits | |

Scholars Diploma (29 Credits)

| Category | Requirement |
|---|---|
| English | Completed |
| Math | 1 credit needed |
| Social_Studies | 1 credit needed |
| Science | 0.5 credit needed |
| Arts_Design | Completed |
| Computer_Tech | Completed |
| FCS | Completed |
| Wellness | Completed |
| Wellness_Elec | Completed |
| PersFin_CareerExp | Completed |
| Grad_Proj | 0.5 credit needed |
| Intern | 0.5 credit needed |
| AH_Other_Elec | Completed |
| 25.5 current total credits | |

METHOD AND SYSTEM FOR CURRICULUM MANAGEMENT SERVICES

CROSS-REFERENCE TO RELATED APPLICATIONS

This application is a continuation of U.S. patent application Ser. No. 14/866,935, filed Sep. 26, 2015, which is a continuation-in-part of U.S. patent application Ser. No. 14/659,562, filed Mar. 16, 2015, which claims the benefit of U.S. Provisional Patent Application No. 61/954,553, filed Mar. 17, 2014, each of which is incorporated by reference herein in its entirety.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to pathway management. More particularly, the invention relates to curriculum management services.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Often times there are multiple pathways a person may take in an academy environment to attain a certification and/or degree. Academies may sometimes provide multiple options and/or courses to fulfill any requirements or attain any skills associated with a person's pursued certification and/or degree. A person's path selection may include factors such as, but not limited to, a specific course, a specific time, or a specific location. Optimization and/or management of a path a person chooses may often be difficult to achieve and/or logically complicated to consider.

The following is an example of a specific aspect in prior art that, while expected to be helpful to further educate the reader as to additional aspects of the prior art, is not to be construed as limiting the present invention, or any embodiments thereof, to anything stated or implied therein or inferred thereupon. By way of educational background, another aspects of the prior art generally useful to be aware of is that existing curriculum and/or course managers may assist a user in ensuring that any requirements for a selected certification or degree requirement from an academy are met. Existing curriculums and/or course managers are often specialized for a specific academy or institution and may only operate with academy or institution data parameters and/or metrics.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow chart illustrating an exemplary process for user input in an interface module, in accordance with an embodiment of the present invention;

FIG. 4 is a flow chart illustrating an exemplary process for pathway determination in a processing module, in accordance with an embodiment of the present invention;

FIG. 5 is a flow chart illustrating an exemplary process for retrieving user data in a user module, in accordance with an embodiment of the present invention;

FIG. 6 is a flow chart illustrating an exemplary process for retrieving course data in a course module, in accordance with an embodiment of the present invention;

FIG. 7 is a flow chart illustrating an exemplary process for retrieving objective data in an objective module, in accordance with an embodiment of the present invention;

FIG. 8 illustrates an exemplary user interface for displaying data in a display module, in accordance with an embodiment of the present invention;

FIG. 9 illustrates an exemplary user interface for selecting objectives, in accordance with an embodiment of the present invention;

FIG. 10 illustrates an exemplary user interface for comparing pathways, in accordance with an embodiment of the present invention;

FIGS. 11A and 11B illustrate exemplary user interfaces for viewing pathway progress, in accordance with an embodiment of the present invention;

FIGS. 12A and 12B illustrate an exemplary user interfaces for viewing pathway progress with course information, in accordance with an embodiment of the present invention;

FIG. 13 illustrates an exemplary user interface for viewing the progression of multiple pathways, in accordance with an embodiment of the present invention;

3

Figure 15:
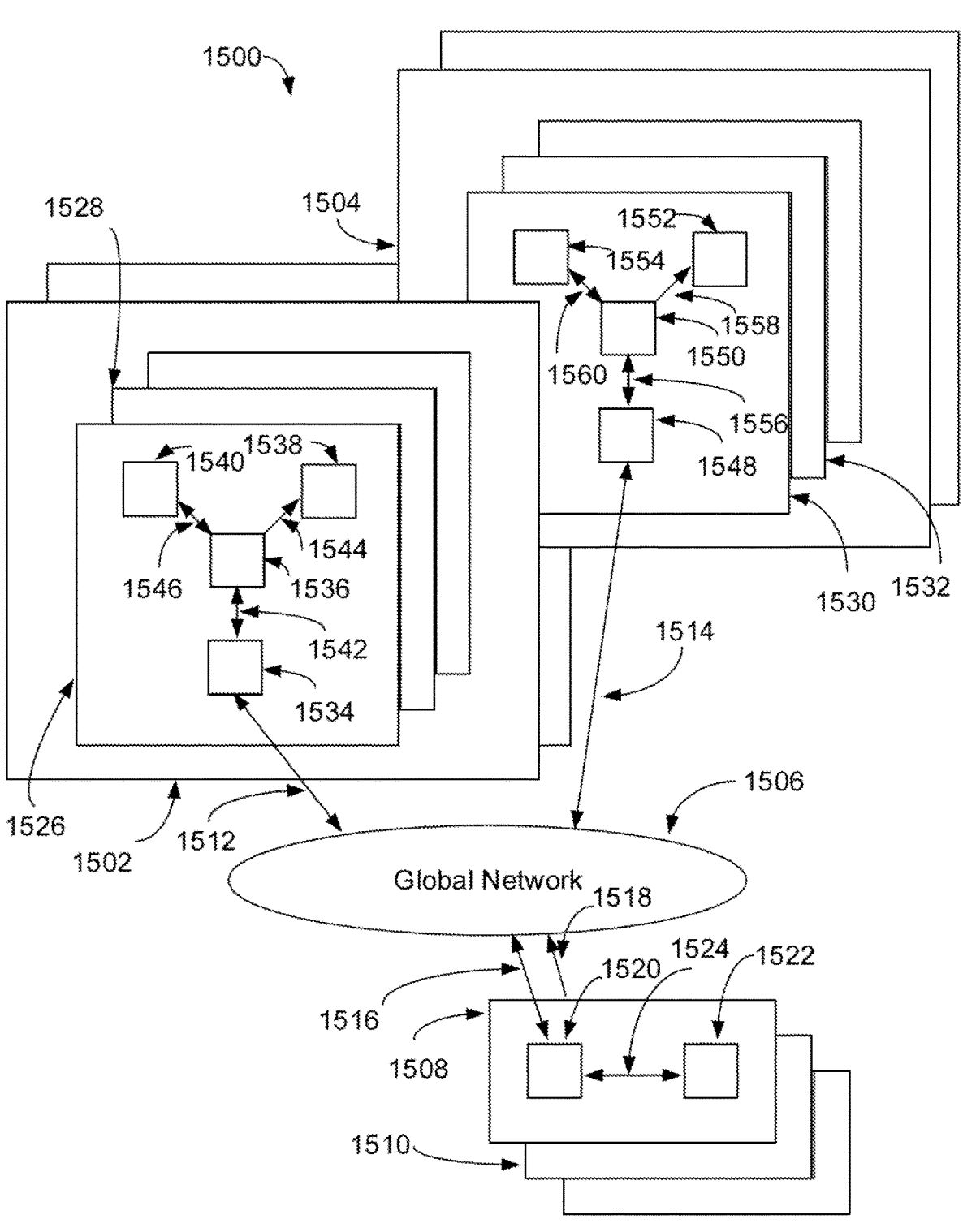

FIG. 15 illustrates a block diagram depicting a conventional client/server communication system.

Unless otherwise indicated illustrations in the figures are not necessarily drawn to scale.

DETAILED DESCRIPTION OF SOME
EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc. v. Roadway Safety Servs., Inc.,* Civ. App. 96-1264, slip op. at 10 (Fed. Cir. Jul. 3, 1997) (unpublished) *Hybridtech v. Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co. v. Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye,* Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C. v. Vector Distribution Sys., Inc.,* 347 F.3d 1314, 1323 (Fed. Cir. 2003) (recognizing the "dual ordinary meaning of th[e] term ["substantially" ] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp. v. American Axle & Manufacturing, Inc.,* Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp. v. Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC v. Vector Distribution Sys., Inc.,* 347 F.3d 1314, 1322 (Fed. Cir. 2003); *Epcon Gas Sys., Inc. v. Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003)

where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit "about 10%" the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially"

eliminated and for the intended purpose, it is believed that the slight portion of the film which may remain is negligible. We are of the view, therefore, that the claims may be regarded as sufficiently accurate." Similarly, *In re Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRMLL), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer read-able medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for providing curriculum management services. Some of these embodiments may comprise computer software. In some of these embodiments, software may be integrated into hardware, including, without limitation, uniquely-designed hardware for running embodiment software.

Figure 1:
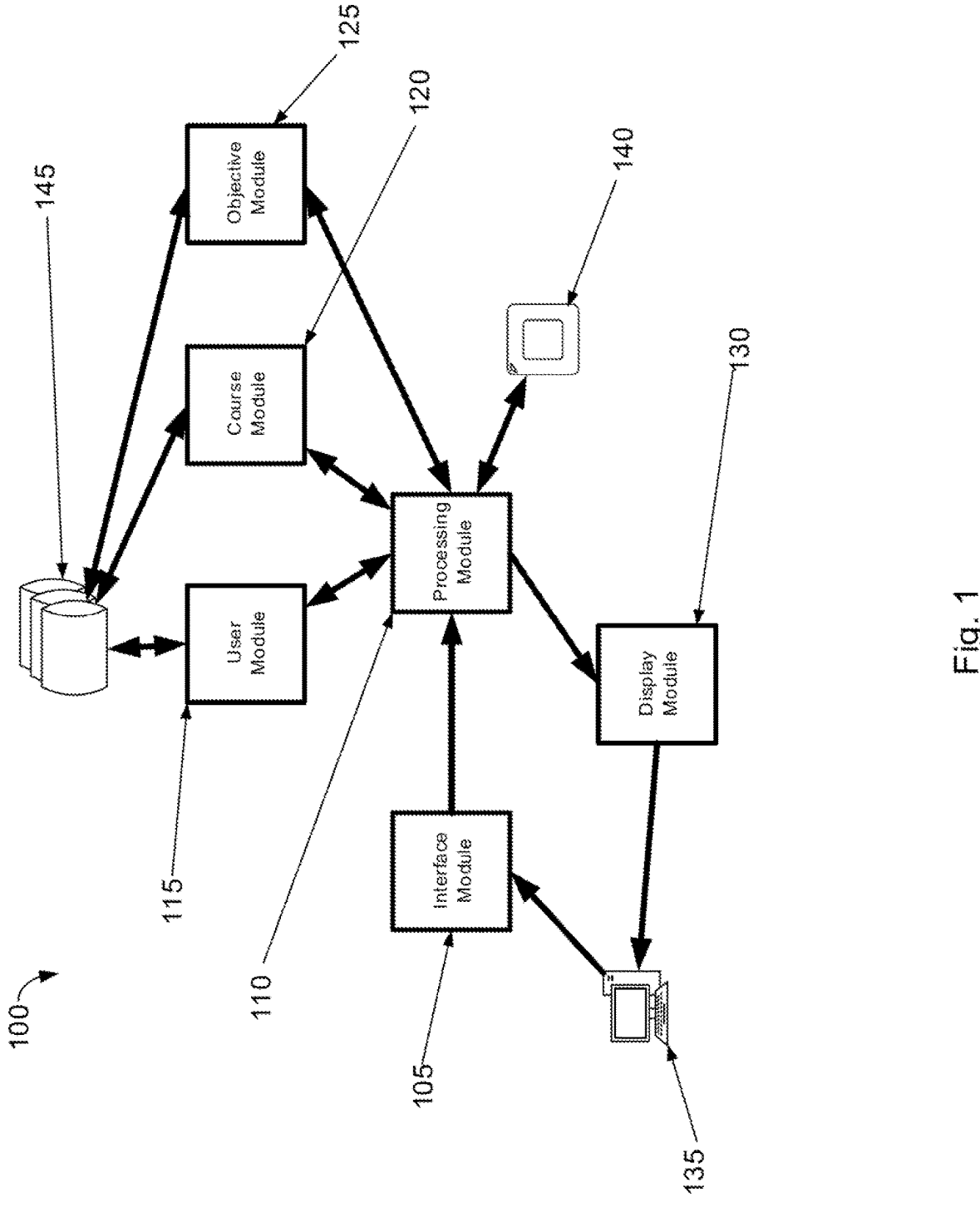
FIG. 1 illustrates the architecture of an exemplary system for providing curriculum management services, in accordance with an embodiment of the present invention.

FIG. 1 illustrates the architecture of an exemplary system for providing curriculum management services, in accordance with an embodiment of the present invention. A curriculum management system 100 may comprise of an interface module 105, a processing module 110, a user module 115, a course module 120, an objective module 125, and a display module 130. An interface module 105 has a means to interact with a user such as, but not limited to, a computer terminal 135, a smartphone, a tablet, smartwatch, or any electronic device that can browse the Internet. Interface module 105 may receive input and/or data from a user and send the input and/or data to a processing module 110. A processing module 110 has a means, such as a processing unit 140, to process user input and execute methods for curriculum management services. User module 115 has a means to access and edit a user's data such as, but not limited to, one or more databases 145, a non-transitory computer readable medium in-memory database management system, an in-cloud database management system. A course module 120 has a means to access one or more institutions' and/or academies' course data such as, but not limited to, one or more databases 145, a non-transitory computer readable medium, in-memory database management system, and in-cloud database management system. The course module 120 has a further means to track a user's progress through an academic or training institution's sequence of course study or individual learning plan and track whether or not the user has met the academic or training institution's diploma requirements. An objective module 125 has a means to access objective entries such as one or more databases 145, a non-transitory computer readable medium, in-memory database management system, and in-cloud database management system. A display module 105 receives information from processing unit 140 and displays the received information to a user with a display means such as, but not limited to, a computer terminal 135, a television, a text notification, a tablet, email notification, a smartphone web browser, smartphone app, smartphone notification, smart watch.

During typical operation, a user may access curriculum management system 100 from a computer terminal 135. A user may send information and/or commands to a processing module 110. A user may enter or update information stored in one or more databases 145. User module 115 may process the entry and/or update of a user dataset containing information such as, but not limited to, a user ID, a user's account information, a user's login information, a user's contact information, a user's objective goals, a user's grades, any courses a user has taken, users ethnicity, user career goals, user personal goals, user academic goals, user educational matriculation goals, highest education level to attain goal, and salary goals. A user may select or be assigned one or more objectives from an objective dataset. A user may also select possible future careers, a Career Pathway, a Career Academy or Differentiated Diploma to plan and guide the user's sequence of course study. An objective module 125 may access one or more databases 145 containing information from one or more objective datasets. Objective datasets may contain information such as, but not limited to, career objectives, academic objectives, educational pathway objectives, certification objectives, educational matriculation objectives, career goal salary, projected openings and projected growth. Objective datasets may also contain information regarding any requirements needed to meet any objectives such as, but not limited to, a credit requirement, a class-hour requirement, any prerequisite courses, any specific courses, standardized test objectives, sequence of course study or individual learning plan, diploma requirements, and Grade Point Average objectives.

Processing module 110 may execute computer code, applets, and/or programs from a non-transitory computer readable medium to determine one or more pathways a user may take to reach one or more objectives. Given an objective from an objective set, processing module 110 may request a course dataset from a course module 120. A course dataset may contain information such as, but not limited to, a course description, a course ID, a subject matter grouping, course-career mapping, course credit, course weight, course level, course pre-requisites, course considerations, course grade level, course Advanced Placement Status, course Honors Status, and cross school articulation status (dual credit with college or other school) from one or more academies and/or training institutions. Processing module 110 may execute algorithms stored in a non-transitory computer readable medium that may be used to determine one or more pathways a user may take to achieve one or more objectives including, but not limited to, a possible future career, a Career Pathway, a Career Academy or Differentiated Diploma to plan and guide a user's sequence of course study.

Information regarding a user's pathways may be sent to a display module 130 and formatted to a graphical user interface for a user to view. Metrics such as, but not limited to, pathway progress, courses taken, a number of credits earned, grades, academy progress, a specific competency, Grade Point Average, may be displayed on a graphical user interface. In addition, a user may view all courses designated for a particular sequence of course study and view specific courses and their descriptions via the graphical user interface, which aligns with the user selected future career/s, a Career/s Pathway, a Career/s Academy or Differentiated Diploma. A user may receive suggestions and/or notifications of recommended courses, inadequate prerequisites, insufficient time to complete a pathway, insufficient credits to complete a pathway, incomplete credits in a subject matter, recommended courses based on career, recommended courses based on academy/pathway, recommended courses based on subject matter, insufficient Grade Point Average for specific pathway/academy, insufficient course level attained, insufficient diploma requirements, insufficient standardized score attained, insufficient course level attained, certifications not met, insufficient portfolio items uploaded, contact information not entered, career goals not entered, pathway/academy goals not entered, educational matriculation goals not entered, post education plans not entered, and personal goals not entered. Data from the user, course, and/or objective datasets may be updated and one or more pathways may be re-determined based on the updated user, course, and/or objective datasets.

It may be appreciated by a person with ordinary skill in the art, in light of and in accordance with the teachings of the present invention, that one or more modules in curriculum management system 100 may be accessible locally or across a network. In another embodiment of the present invention, curriculum management system 100 may be entirely located in a single computer or processing platform. In still another embodiment of the present invention, each module of curriculum management system 100 may be located in physically different locations and accessed across a network.

It may be appreciated by a person with ordinary skill in the art, in light of and in accordance with the teachings of the present invention, that one or more users may access a specific user's user, course, and/or objective datasets. In another embodiment of the present invention, an academic institution that a user is enrolled at may alter any data in a user's user, course, and/or objective datasets such as, without limitation, available courses, available objectives, user data, available Pathways/Academies, available subject matter groupings in Pathways/Academies, subject matter grouping credit requirements, Pathways/Academies credit requirements, subject matter grouping course mappings, course-career mappings, Pathways/Academies GPA requirements, subject matter grouping course level requirements, Pathways/Academies standardized test score requirements, Pathways/Academies certifications required, and Pathways/Academies portfolio items required.

It may be appreciated by a person with ordinary skill in the art, in light of and in accordance with the teachings of the present invention, that virtually any form of user training may be part of a course data set. User training may be, without limitation, academic courses, internships, training, work hours, mentorships, job shadows, leadership experiences, workshops, and courses from OTHER educational intuitions through articulated agreements. In another embodiment of the present invention, a course data set may include internships, training sessions, and certifications.

It may be appreciated by a person with ordinary skill in the art, in light of and in accordance with the teachings of the present invention, that virtually any objective may be part of an objective data set. Objectives may be, but not limited to, attaining academic degrees, achieving certifications, personal achievements, future career choices, academic diplomas, user personal goals, user educational matriculation goals (college, trade school, etc.), highest education level to attain goal, salary goals, and post education goals. In another embodiment of the present invention, objectives may include future career choices or a career at a specific company. In an alternative embodiment of the present invention, an objective may be a physical objective such as, without limitation, losing weight or achieving a certain level of strength.

It may be appreciated by a person with ordinary skill in the art, in light of and in accordance with the teachings of the present invention, that one or more modules may be embodied in one or more hardware devices. In another embodiment of the present invention, all the modules in curriculum management system 100 may be located on one computing platform. In another embodiment of the present invention, a module in curriculum management system 100 may be embodied in a plurality of computing devices connected over a network.

Figure 2:
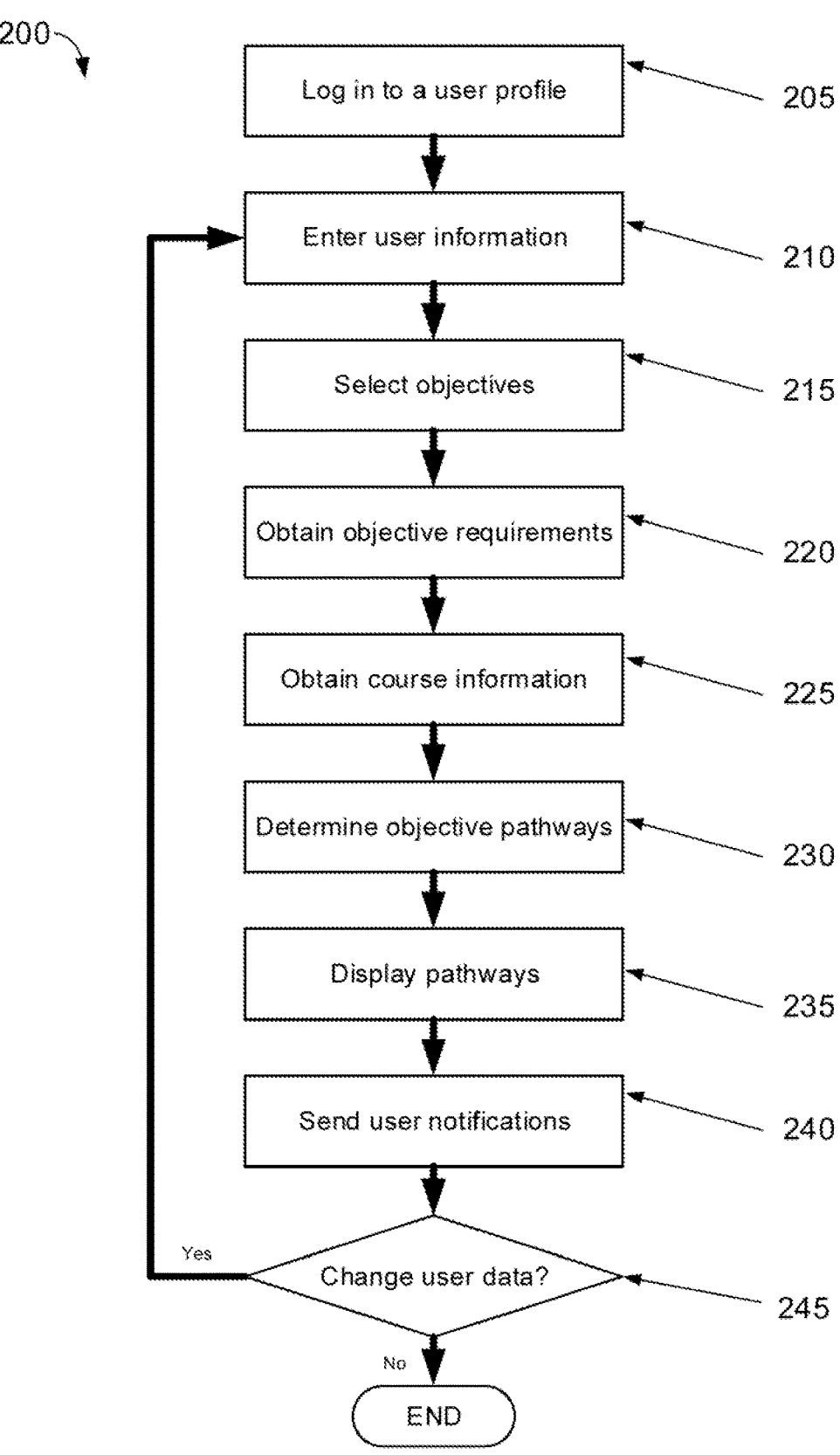
FIG. 2 is a flow chart illustrating an exemplary process for curriculum management, in accordance with an embodiment of the present invention.

FIG. 2 is a flow chart illustrating an exemplary process for curriculum management, in accordance with an embodiment of the present invention. A curriculum management process 200 begins with a log in to a user profile step 205. A user may access a user profile containing personal information and/or preferences. An enter user information step 210 may allow a user to enter and/or update user information such as, but not limited to, user personal information, user preferences, user objectives, a user's login information, a user's contact information, a user's objective goals, user's Pathway/Academy goal, users ethnicity, user career goals, user personal goals, user academic goals, user educational matriculation goals (college, trade school, etc.), highest education level to attain goal, salary goals, and user post high education goals. A user selects and/or is assigned objectives such as, but not limited to, academic degrees, certifications, career goals, a user's objective goals, user career goals, user personal goals, user academic goals, user educational matriculation goals, highest education level to attain goal, and salary goals in a select objectives step 215. In an obtain objective requirements step 220, one or more databases are accessed to obtain an objective data set containing requirements for one or more objectives. An obtain course information step 225 accesses one or more databases to obtain a course data set containing course information such as, but not limited to, course prerequisites, course descriptions, course credit values, a course ID, course-career map, course credit, course weight, course level, course pre-requisites, course considerations, course grade level, course Advanced Placement Status, course Honors Status, and course cross school articulation status (dual credit with college or other school). A processing module executes algorithms and/or computer code from a non-transitory computer readable medium to determine pathways to achieve an objective in a determine objective pathways step 230. One or more determined pathways may be displayed to the user in a display pathways step 235. Notifications and/or error messages may be sent to a user informing the user of any suggested actions and/or problems with one or more selected pathways in a send user notifications step 240. At a change user data step 245, a user may decide to edit any user data and/or preferences. If a user decides to edit any user data, curriculum management process 200 returns to enter user information step 210.

It may be appreciated by a person with ordinary skill in the art, in light of and in accordance with the teachings of the present invention, that curriculum management progress 200 may determine objective pathways including a plurality of different courses from different academies and/or institutions. In another embodiment of the present invention, an objective pathway may interchange courses from different academies and/or institutions if the courses share a common tag such as, but not limited to, similar course material, similar course field, Core courses, Non-Core courses, English courses, Math courses, Science courses, Social Studies courses, Foreign Language courses, Pathway courses, Academy courses, Art courses, Family consumer Science courses, Wellness courses, Career Elective courses, Other electives courses, Technology courses, and Business courses.

It may be appreciated by a person with ordinary skill in the art, in light of and in accordance with the teachings of the present invention, that virtually any information may be used in determining a user pathway. Pathway determining information may be, but not limited to, a user's pathway history, a user's personal interactions with academy and/or institution officials, updated course or objective information, interdisciplinary groupings, a competency, mentorship experience, job shadow experience, course experience, Career Outlook, Career Salary, Users personal interests, strengths and weaknesses, users educational goals, and users answers to HOLLAND's RIASEC test. In another embodiment of the present invention, a user's interaction with a counselor and/or a counselor's input to a user's data set may be used in determining an optimal pathway for a user.

It may be appreciated by a person with ordinary skill in the art, in light of and in accordance with the teachings of the present invention, that one or more steps in curriculum management process 200 may be added, removed, or rearranged. In some embodiments of the present invention, curriculum management process 200 may omit the steps of 210, 215, 240, and 245. In other embodiments of the present invention, the order of steps 210, 215, 240, and 245 in curriculum management process 200 may occur in any order. In still other embodiments of the present invention, additional steps such as, but not limited to pathway/academy name, subject matter grouping names, subject matter to pathway mapping, course to subject matter groupings mapping, credits to complete a pathway, recommended courses based on career, recommended courses based on academy/pathway, recommended competency based on academy/pathway, recommended courses based on subject matter grouping, Grade Point Average for specific pathway/academy, course level attained for subject matter grouping, standardized score attained for pathway, certifications for pathway, portfolio items needed for pathway, course name, a course ID, course-career map, course credit, course weight, course level, course pre-requisites, course considerations, course grade level, course Advanced Placement Status, course Honors Status, and course cross school articulation status (dual credit with college or other school may be added to curriculum management process 200.

FIG. 3 is a flow chart illustrating an exemplary process for user input in an interface module, in accordance with an embodiment of the present invention. A user input process 300 begins with a receive user input step 305. A user may interact with a user interface terminal such as, without limitation, a smartphone, a desktop, a tablet, a computer terminal, a smartphone web browser, smartphone app, smart watch web browser, smart watch app. User information and inputs may be entered into the user interface terminal and sent to a processing module in a send input step 310.

It may be appreciated by a person with ordinary skill in the art, in light of and in accordance with the teachings of the present invention, that an interface module may process input at a user interface terminal before sending any information and/or input to a processing module. In an alternative embodiment of the present invention, a user may input commands via gestures and a user interface terminal converts the gestures into commands for a processing module before sending the commands to the processing module.

It may be appreciated by a person with ordinary skill in the art, in light of and in accordance with the teachings of the present invention, that one or more steps in user input process 300 may be added, removed, or rearranged. In other embodiments of the present invention, the order of steps in user input process 300 may occur in any order. In still other embodiments of the present invention, additional steps may be added to user input process 300.

FIG. 4 is a flow chart illustrating an exemplary process for pathway determination in a processing module, in accordance with an embodiment of the present invention. A pathway determination process 400 begins with a read user data step 405. A request for a user data set is sent and user data and/or preferences are read. Information read such as, but not limited to, a user's desired graduation date, a user's budget, available Pathways/Academies, available subject matter groupings in Pathways/Academies, subject matter grouping credit requirements, Pathways/Academies credit requirements, subject matter grouping course mappings, course-career mappings, Pathways/Academies GPA requirements, subject matter grouping course level requirements, competencies, Pathways/Academies standardized test score requirements, Pathways/Academies certifications required, and Pathways/Academies portfolio items required may be used for a user's pathway calculations. A processing module receives one or more user's objectives in a receive user objectives step 410. A read objective data step 415 sends a request to an objective module for one or more objective data sets containing information such as, but not limited to, course requirements, academy requirements, competencies, available Pathways/Academies, available subject matter groupings in Pathways/Academies, subject matter grouping credit requirements, Pathways/Academies credit requirements, subject matter grouping course mappings, course-career mappings, Pathways/Academies GPA requirements, subject matter grouping course level requirements, Pathways/Academies standardized test score requirements, Pathways/Academies certifications required, and Pathways/Academies portfolio items required, needed for achieving an objective. A read course data step 420 sends a request to a course module for one or more course data sets containing course information such as, but not limited to, course descriptions, course prerequisites, course prerequisites, course credit values, a course ID, course-career map, course credit, course weight, course level, course pre-requisites, course considerations, course grade level, course Advanced Placement Status, course Honors Status, and course cross school articulation status (dual credit with college or other school). One or more pathways for a user may be determined by running an algorithm or computer code stored in a non-transitory computer readable medium in a determine pathways step 425. Information received from the one or more user data sets, course data sets, and/or objective data sets may be used to determine a user's one or more pathways to achieve one or more objectives.

Notifications and/or alerts regarding one or more pathways may be generated to inform a user of any information regarding a calculated pathway. In a generate notifications step 430 notifications and/or alerts such as, but not limited to, notifications of insufficient time to complete a pathway, recommendations for a specific pathway, recommendations for additional objections, insufficient credits to complete a pathway, incomplete credits in a subject matter, recommended courses based on career, recommended courses based on academy/pathway, recommended courses based on subject matter, insufficient Grade Point Average for specific pathway/academy, insufficient course level attained, insufficient standardized score attained, insufficient course level attained, certifications not met, insufficient portfolio items uploaded, contact information not entered, career goals not entered, pathway/academy goals not entered, educational matriculation goals not entered, post education plans not entered, and personal goals not entered may be generated and/or sent to a user. In a send display data step 435, any data that is relevant to a user may be sent to a display module for a user to view. Data sent to a display module may be, but not limited to, course information, suggested pathways, course recommendation, total credits, total GPA, course recommendations, subject matter groupings, courses completed in subject matter groupings, suggested courses in subject matter groupings, career goals-course mapping alerts, and completed subject matter grouping alert.

It may be appreciated by a person with ordinary skill in the art, in light of and in accordance with the teachings of the present invention, that one or more steps in the pathway determination process 400 may be added, removed, or rearranged. In other embodiments of the present invention, the order of steps 410, 415, and 420 in the pathway determination process 400 may occur in any order. In still other embodiments of the present invention, additional steps may be added to the pathway determination process 400.

FIG. 5 is a flow chart illustrating an exemplary process for retrieving user data in a user module, in accordance with an embodiment of the present invention. A retrieve user data process 500 begins with a wait for user data request step 505. A user module waits for a request for one or more user data sets which may comprise of, without limitation, user identification information, an access key, an institution id, database string, database username, database password, URL sub domain. A user module accesses one or more databases in an access database step 510 which may contain user information such as a user's profile, settings, and/or preferences, a user's personal information, user objectives, a user's login information, a user's contact information, a user's objective goals, user's Pathway/Academy goal, users ethnicity, user career goals, user personal goals, user academic goals, user educational matriculation goals (college-trade school, etc.), highest education level to attain goal, salary goals, user post high education goals. The user module may send the data to a processing module in a send user data set step 515.

It may be appreciated by a person with ordinary skill in the art, in light of and in accordance with the teachings of the present invention, that a user data set may be retrieved partially or entirely from one or more databases. In another embodiment of the present invention, a plurality of user data sets may be retrieved from a plurality of databases from different organizations, academies, and/or institutions.

It may be appreciated by a person with ordinary skill in the art, in light of and in accordance with the teachings of the present invention, that one or more steps in the retrieve user data process 500 may be added, removed, or rearranged. In other embodiments of the present invention, the order of steps in the retrieve user data process 500 may occur in any order. In still other embodiments of the present invention, additional steps may be added to the retrieve user data process 500.

FIG. 6 is a flow chart illustrating an exemplary process for retrieving course data in a course module, in accordance with an embodiment of the present invention. A retrieve course data process 600 begins with a wait for course data set request step 605. A course module waits for a request for course data which may comprise of, without limitation, user identification information, an access key, course set identification information, objective defined courses, user identification information, an access key, objective tag data, an institution id, database string, database username, database password, and URL sub domain. A course module accesses one or more databases in an access database step 610 which may contain course information such as a course description, metadata for a course, a course library, course prerequisites, course credit values, a course ID, course-career map, course credit, course weight, course level, course pre-requisites, course considerations, course grade level, course Advanced Placement Status, course Honors Status, and course cross school articulation status (dual credit with college or other school). The course module may send the accessed database data to a processing module in a send course data set step 615.

It may be appreciated by a person with ordinary skill in the art, in light of and in accordance with the teachings of the present invention, that a course data set may be retrieved partially or entirely from one or more databases. In another embodiment of the present invention, a plurality of course data sets may be retrieved from a plurality of databases from different organizations, academies, and/or institutions.

It may be appreciated by a person with ordinary skill in the art, in light of and in accordance with the teachings of the present invention, that one or more steps in the retrieve course data process 600 may be added, removed, or rearranged. In other embodiments of the present invention, the order of steps in the retrieve course data process 600 may occur in any order. In still other embodiments of the present invention, additional steps may be added to the retrieve course data process 600.

FIG. 7 is a flow chart illustrating an exemplary process for retrieving objective data in an objective module, in accordance with an embodiment of the present invention. A retrieve objective data process 700 begins with a wait for objective data set request step 705. An objective module waits for a request for objective data which may comprise of, without limitation, user identification information, an access key, objective tag data, an institution id, database string, database username, database password, URL sub domain. An objective module accesses one or more databases in an access database step 710 which may contain objective information such as a course list, objective requirements, a course dependency chart, courses completed, all subject matter grouping courses, subject matter grouping to pathway map, a user's profile, settings, and/or preferences, a user's personal information, user objectives, a user's login information, a user's contact information, a user's objective goals, user's Pathway/Academy goal, users ethnicity, user career goals, user personal goals, user academic goals, user educational matriculation goals (college-trade school, etc.), highest education level to attain goal, salary goals, and user post high education goals. The objective module may send the accessed database data to a processing module in a send objective data set step 715.

It may be appreciated by a person with ordinary skill in the art, in light of and in accordance with the teachings of the present invention, that an objective data set may be retrieved partially or entirely from one or more databases. In another embodiment of the present invention, a plurality of objective data sets may be retrieved from a plurality of databases from different organizations, academies, and/or institutions.

It may be appreciated by a person with ordinary skill in the art, in light of and in accordance with the teachings of the present invention, one or more steps in the retrieve objective data process 700 may be added, removed, or rearranged. In still other embodiments of the present invention, additional steps such as, but not limited to, data is encrypted in most cases whenever being sent or decrypted when received may be added to the retrieve objective data process 700.

FIG. 8 is a flow chart illustrating an exemplary process for displaying data in a display module, in accordance with an embodiment of the present invention. A display data process 800 begins with a receive results data step 805. During receive results data step 805, a display module receives data associated with the execution results of a computer code and/or software running on a processing module such as, but not limited to, calculated pathways, course information, user information, notifications, total credits, total GPA, course recommendations, subject matter groupings, courses completed in subject matter groupings, suggested courses in subject matter groupings, career goalscourse mapping alerts, and completed subject matter grouping alert. The received results data is formatted in a format data step 810, wherein the data is converted, by a processing means such as a processor, for specific user interfaces such as, but not limited to, screens, speakers, a computer, a tablet, text, email, a smartphone web browser, smartphone app, smartphone notification, smart watch. A display data step 815 presents the formatted data to a user through presentation means such as, but not limited to, screens, speakers, computer, a tablet, text, email, a smartphone web browser, smartphone app, smartphone notification, and smart watch.

It may be appreciated by a person with ordinary skill in the art, in light of and in accordance with the teachings of the present invention, that format data step 810 may format data intended for a user for virtually any device. Format data step 810 may format data for devices such as, but not limited to, smartphones, computer monitors, televisions, stereoscopic displays, listening devices, smartphone app, smart watch web browser, and smart watch app. In an alternative embodiment of the present invention, data intended for a user may be converted to a sound file and audibly played to a user.

It may be appreciated by a person with ordinary skill in the art, in light of and in accordance with the teachings of the present invention, that one or more steps in the display data process 800 may be added, removed, or rearranged.

FIG. 9 illustrates an exemplary user interface for selecting objectives, in accordance with an embodiment of the present invention. A select objective user interface 900 may comprise of an objective list 905 and a pathway list 910. A user may select an objective from objective list 905 and a user data set may be updated with a user's objective selection. A list of potential pathways for achieving one or more user objectives may be determined and selected from a pathway list 910. Pathways from pathway list 910 may include, but not limited to, a sequence of course study, a set of required certifications, Art & Humanities Pathway, Scholars Diploma, Undeclared, Industry & Engineering Academy, Mechatronics Certification, this can be anything a school may call it.

It may be appreciated by a person with ordinary skill in the art, in light of and in accordance with the teachings of the present invention, that virtually any graphical user interface display element may be used to display an objective list 905 and/or a pathway list 910. Lists may be displayed as, without limitation, a series of buttons, a list of radio buttons, a set of links, a list in a select box, a list of checkboxes.

FIG. 10 illustrates an exemplary user interface for comparing pathways, in accordance with an embodiment of the present invention. A compare pathway user interface 1000 may comprise of a pathway list 1005 and an objective list 1010. A user may select one or more pathways from pathway list 1005 and an objective from objective list 1010 to determine one or more pathways to be compared.

FIGS. 11A and 11B illustrate exemplary user interfaces for viewing pathway progress, in accordance with an embodiment of the present invention. A pathway progress view 1100 may comprise of a course grouping tag 1105, one or more course groups 1110, one or more course group headers 1115, a group progress message 1120, a course options group 1125, and a notification message 1130. A course grouping tag 1105 may display virtually any tag related to one or more groups of courses in a pathway such as, but not limited to, a set of courses priority or importance, a set of courses difficulty, a set of courses cost, a set of core courses, a set of non-core courses, a set of pathway/academy requirements, a set of pathway/academy experiences. One or more course groups 1110 may contain courses that may fulfill a pathway's requirements and may be classified in a broad category such as, but not limited to, a field of study, a type of certification, a subject matter, a school department, an academic field of study, a technical field of study, a technical shop, a pathway/academy require course sequence, a set of elective courses, a set of career related courses, a set of career related requirements (quantity of portfolio uploads, certain GPA, a required standardized test score), a set of career related experiences (mentorship, job shadow). One or more headers 1115 may be used to visually aid a user in see how one or more course groups 1110 are distributed. A user progress message 1125 may be virtually any representation of user progress on a pathway such as, but not limited to, a numerical credit value, a progress bar, a completed course list, a table, a chart (histogram, pie, etc.), a color coded alert box/message. Course options group 1125 contains a list of courses that a user may take to further progress on a pathway. Notification message 1130 may be virtually any form of notification and/or alert message that may provide insight regarding a user's pathway such as, but not limited to, course recommendations, warnings of user preference violations, helpful course selection tips, helpful course selection tips (based on career, based on pathway/academy course of study), based on grade level, based on year of study level, based on course level, based on subject matter grouping, based on course credit, based on course articulation agreements, based on courses that provide credit at future educational institutions (Advanced Placement courses or other school).

It may be appreciated by a person with ordinary skill in the art, in light of and in accordance with the teachings of the present invention, that virtually any form of visual notification may be used to aid a user in comparing pathways and/or course groups. Visual aids such as, but not limited to, color differentiation, movement, pop-ups, highlighting, icons numerical, or text alert after course (ex: Chemistry 9th, AP, etc), and auditory aids. In another embodiment of the present invention, courses from a pathway that a user have taken may be colored green and courses on a pathway that must be taken may be colored red. In still another embodiment of the present invention, completed and/or priority courses may have an icon next to a course listing.

FIGS. 12A and 12B illustrate exemplary user interfaces for viewing pathway progress with course information, in accordance with an embodiment of the present invention. A pathway progress view with course information 1200 comprises of a pathway progress view 1205 and a course information window 1210. A user may move a cursor and/or select a course from a pathway progress view 1205 and a course information window 1210 may pop up or expand to display information regarding the selected course. Information regarding a course may be from a course data set and/or accessed from a database. When a course is deselected and/or a cursor moves away from a course, course information window 1210 may close and/or hide from a user's graphical interface.

It may be appreciated by a person with ordinary skill in the art, in light of and in accordance with the teachings of the present invention, that a user may view virtually any information from any number of courses. In another embodiment of the present invention, a user may simultaneously view part or all information for all courses that are part of a specific pathway.

It may be appreciated by a person with ordinary skill in the art, in light of and in accordance with the teachings of the present invention, that course information from course information window 1210 is not limited to a text display. Course information may be displayed as, without limitation, a sound file, a color coded message, an infographic, a table, a chart (histogram, pie, etc.), and a color coded alert box/message. In another embodiment of the present invention, course information such as a course grouping may be represented by course information window 1210 as a color coded window background.

FIG. 13 illustrates an exemplary user interface for viewing the progression of multiple pathways, in accordance with an embodiment of the present invention. A multiple pathway progression user interface 1300 may comprise of one or more pathway boxes 1305, a course group listing 1310, a course group progression message 1315, a course group completion message 1320, and a pathway progression message 1325. One or more pathway boxes 1305 contain course progression information for one or more different pathways a user has selected. A course group listing 1310 contains a listing of all course groups in a pathway. Course group progression message 1315 may be virtually any message display course progression information to a user such as, but not limited to, a number of completed credits, a progress bar, a completed course list, a table, a chart (histogram, pie, etc.), and a color coded alert box/message. A course group completion message 1320 may be any message to display to a user that a course group has been completed such as, but not limited to, a progress bar, a completion message, a completion icon, a numerical credit value, a completed course list, a table, a chart (histogram, pie, speedometer etc.), and a color coded alert box/message. A pathway progression message 1325 may be virtually any message to display a user's pathway progression such as, but not limited to, a progress bar, a progress message, a completion message, a completion icon, a numerical credit value, a completed course list, a table, a chart (histogram, pie, speedometer etc.), and a color coded alert box/message.

It may be appreciated by a person with ordinary skill in the art, in light of and in accordance with the teachings of the present invention, that a user may track their progress of a pathway with virtually any criteria. A user may track the progress of pathways with criteria such as, but not limited to, a specific field, a specific academy and/or institution, a specific pathway, a course of study, a technical program, a certification, a technical shop, a degree, and a major. In another embodiment of the present invention, a user may track the pathways of a specific academic and/or institution. In still another embodiment of the present invention, a user may be able to track the requirements of a specific academy's or institution's pathway.

Figure 14:
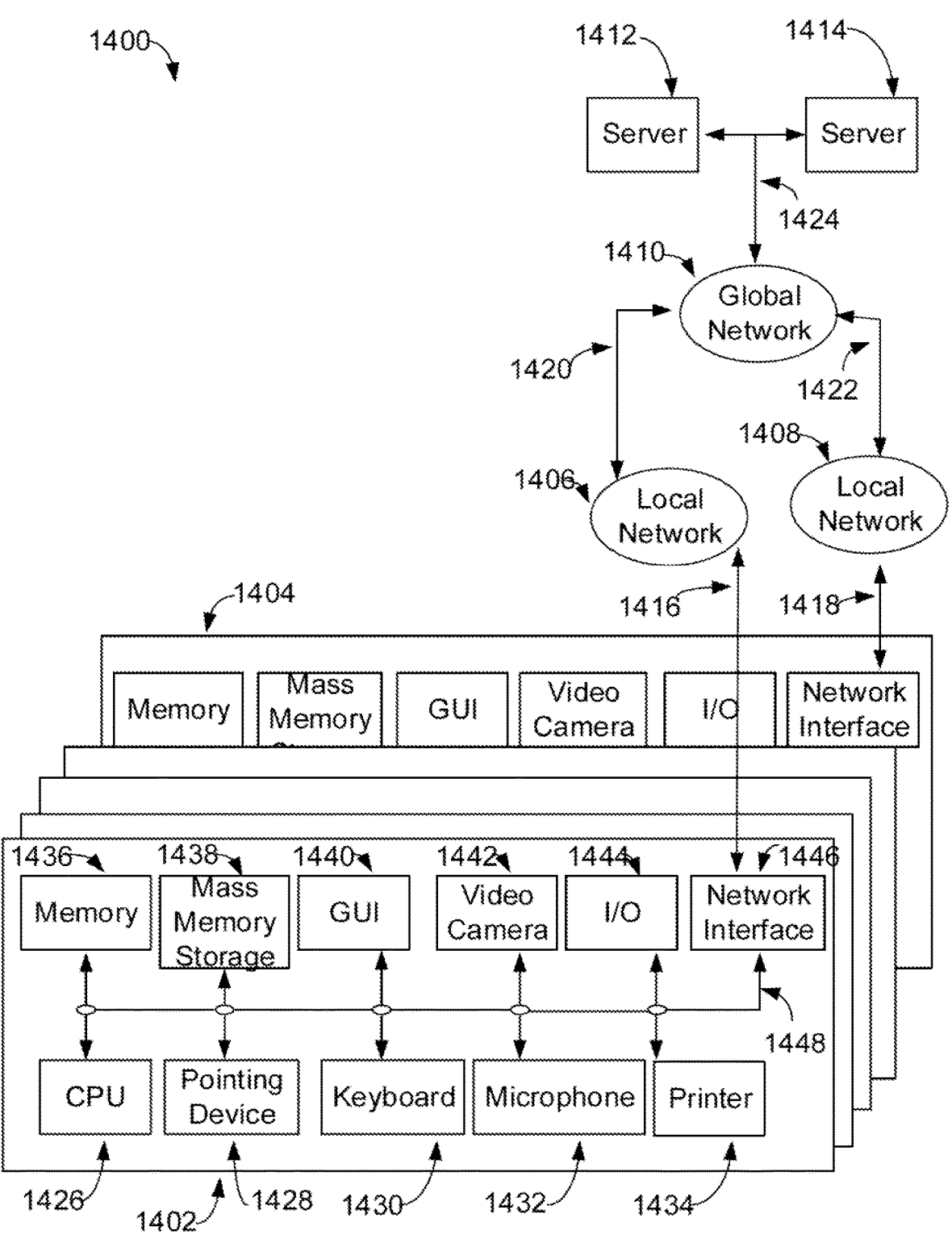
FIG. 14 is a block diagram depicting an exemplary client/server system which may be used by an exemplary web-enabled/networked embodiment of the present invention.

FIG. 14 is a block diagram depicting an exemplary client/server system which may be used by an exemplary web-enabled/networked embodiment of the present invention.

A communication system 1400 includes a multiplicity of clients with a sampling of clients denoted as a client 1402 and a client 1404, a multiplicity of local networks with a sampling of networks denoted as a local network 1406 and a local network 1408, a global network 1410 and a multiplicity of servers with a sampling of servers denoted as a server 1412 and a server 1414.

Client 1402 may communicate bi-directionally with local network 1406 via a communication channel 1416. Client 1404 may communicate bi-directionally with local network 1408 via a communication channel 1418. Local network 1406 may communicate bi-directionally with global network 1410 via a communication channel 1420. Local network 1408 may communicate bi-directionally with global network 1410 via a communication channel 1422. Global network 1410 may communicate bi-directionally with server 1412 and server 1414 via a communication channel 1424.

Server 1412 and server 1414 may communicate bi-directionally with each other via communication channel 1424. Furthermore, clients 1402, 1404, local networks 1406, 1408, global network 1410 and servers 1412, 1414 may each communicate bi-directionally with each other.

In one embodiment, global network 1410 may operate as the Internet. It will be understood by those skilled in the art that communication system 1400 may take many different forms. Non-limiting examples of forms for communication system 1400 include local area networks (LANs), wide area networks (WANs), wired telephone networks, wireless networks, or any other network supporting data communication between respective entities.

Clients 1402 and 1404 may take many different forms. Non-limiting examples of clients 1402 and 1404 include personal computers, personal digital assistants (PDAs), cellular phones and smartphones.

Client 1402 includes a CPU 1426, a pointing device 1428, a keyboard 1430, a microphone 1432, a printer 1434, a memory 1436, a mass memory storage 1438, a GUI 1440, a video camera 1442, an input/output interface 1444, and a network interface 1446.

CPU 1426, pointing device 1428, keyboard 1430, microphone 1432, printer 1434, memory 1436, mass memory storage 1438, GUI 1440, video camera 1442, input/output interface 1444 and network interface 1446 may communicate in a unidirectional manner or a bi-directional manner with each other via a communication channel 1448. Communication channel 1448 may be configured as a single communication channel or a multiplicity of communication channels.

CPU 1426 may be comprised of a single processor or multiple processors. CPU 1426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1436 is used typically to transfer data and instructions to CPU 1426 in a bi-directional manner. Memory 1436, as discussed previously, may include any suitable computer-readable media, intended for data storage, such as those described above excluding any wired or wireless transmissions unless specifically noted. Mass memory storage 1438 may also be coupled bi-directionally to CPU 1426 and provides additional data storage capacity and may include any of the computer-readable media described above. Mass memory storage 1438 may be used to store programs, data and the like and is typically a secondary storage medium such as a hard disk. It will be appreciated that the information retained within mass memory storage 1438, may, in appropriate cases, be incorporated in standard fashion as part of memory 1436 as virtual memory.

CPU 1426 may be coupled to GUI 1440. GUI 1440 enables a user to view the operation of computer operating system and software. CPU 1426 may be coupled to pointing device 1428. Non-limiting examples of pointing device 1428 include computer mouse, trackball and touchpad. Pointing device 1428 enables a user with the capability to maneuver a computer cursor about the viewing area of GUI 1440 and select areas or features in the viewing area of GUI 1440. CPU 1426 may be coupled to keyboard 1430. Keyboard 1430 enables a user with the capability to input alphanumeric textual information to CPU 1426. CPU 1426 may be coupled to microphone 1432. Microphone 1432 enables audio produced by a user to be recorded, processed and communicated by CPU 1426. CPU 1426 may be connected to printer 1434. Printer 1434 enables a user with the capability to print information to a sheet of paper. CPU 1426 may be connected to video camera 1442. Video camera 1442 enables video produced or captured by user to be recorded, processed and communicated by CPU 1426.

CPU 1426 may also be coupled to input/output interface 1444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1426 optionally may be coupled to network interface 1446 which enables communication with an external device such as a database or a computer or telecommunications or internet network using an external connection shown generally as communication channel 1416, which may be implemented as a hardwired or wireless communications link using suitable conventional technologies. With such a connection, CPU 1426 might receive information from the network, or might output information to a network in the course of performing the method steps described in the teachings of the present invention.

FIG. 15 illustrates a block diagram depicting a conventional client/server communication system.

A communication system 1500 includes a multiplicity of networked regions with a sampling of regions denoted as a network region 1502 and a network region 1504, a global network 1506 and a multiplicity of servers with a sampling of servers denoted as a server device 1508 and a server device 1510.

Network region 1502 and network region 1504 may operate to represent a network contained within a geographical area or region. Non-limiting examples of representations for the geographical areas for the networked regions may include postal zip codes, telephone area codes, states, counties, cities and countries. Elements within network region 1502 and 1504 may operate to communicate with external elements within other networked regions or within elements contained within the same network region.

In some implementations, global network 1506 may operate as the Internet. It will be understood by those skilled in the art that communication system 1500 may take many different forms. Non-limiting examples of forms for communication system 1500 include local area networks (LANs), wide area networks (WANs), wired telephone networks, cellular telephone networks or any other network supporting data communication between respective entities via hardwired or wireless communication networks. Global network 1506 may operate to transfer information between the various networked elements.

Server device 1508 and server device 1510 may operate to execute software instructions, store information, support database operations and communicate with other networked elements. Non-limiting examples of software and scripting languages which may be executed on server device 1508 and server device 1510 include C, C++, C# and Java.

Network region 1502 may operate to communicate bi-directionally with global network 1506 via a communication channel 1512. Network region 1504 may operate to communicate bi-directionally with global network 1506 via a communication channel 1514. Server device 1508 may operate to communicate bi-directionally with global network 1506 via a communication channel 1516. Server device 1510 may operate to communicate bi-directionally with global network 1506 via a communication channel 1518. Network region 1502 and 1504, global network 1506 and server devices 1508 and 1510 may operate to communicate with each other and with every other networked device located within communication system 1500.

Server device 1508 includes a networking device 1520 and a server 1522. Networking device 1520 may operate to communicate bi-directionally with global network 1506 via communication channel 1516 and with server 1522 via a communication channel 1524. Server 1522 may operate to execute software instructions and store information.

Network region 1502 includes a multiplicity of clients with a sampling denoted as a client 1526 and a client 1528. Client 1526 includes a networking device 1534, a processor 1536, a GUI 1538 and an interface device 1540. Non-limiting examples of devices for GUI 1538 include monitors, televisions, cellular telephones, smartphones and PDAs (Personal Digital Assistants). Non-limiting examples of interface device 1540 include pointing device, mouse, track-ball, scanner and printer. Networking device 1534 may communicate bi-directionally with global network 1506 via communication channel 1512 and with processor 1536 via a communication channel 1542. GUI 1538 may receive information from processor 1536 via a communication channel 1544 for presentation to a user for viewing. Interface device 1540 may operate to send control information to processor 1536 and to receive information from processor 1536 via a communication channel 1546. Network region 1504 includes a multiplicity of clients with a sampling denoted as a client 1530 and a client 1532. Client 1530 includes a networking device 1548, a processor 1550, a GUI 1552 and an interface device 1554. Non-limiting examples of devices for GUI 1538 include monitors, televisions, cellular telephones, smartphones and PDAs (Personal Digital Assistants). Non-limiting examples of interface device 1540 include pointing devices, mousse, trackballs, scanners and printers. Networking device 1548 may communicate bi-directionally with global network 1506 via communication channel 1514 and with processor 1550 via a communication channel 1556. GUI 1552 may receive information from processor 1550 via a communication channel 1558 for presentation to a user for viewing. Interface device 1554 may operate to send control information to processor 1550 and to receive information from processor 1550 via a communication channel 1560.

For example, consider the case where a user interfacing with client 1526 may want to execute a networked application. A user may enter the IP (Internet Protocol) address for the networked application using interface device 1540. The IP address information may be communicated to processor 1536 via communication channel 1546. Processor 1536 may then communicate the IP address information to networking device 1534 via communication channel 1542. Networking device 1534 may then communicate the IP address information to global network 1506 via communication channel 1512. Global network 1506 may then communicate the IP address information to networking device 1520 of server device 1508 via communication channel 1516. Networking device 1520 may then communicate the IP address information to server 1522 via communication channel 1524. Server 1522 may receive the IP address information and after processing the IP address information may communicate return information to networking device 1520 via communication channel 1524. Networking device 1520 may communicate the return information to global network 1506 via communication channel 1516. Global network 1506 may communicate the return information to networking device 1534 via communication channel 1512. Networking device 1534 may communicate the return information to processor 1536 via communication channel 1542. Processor 1546 may communicate the return information to GUI 1538 via communication channel 1544. User may then view the return information on GUI 1538.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: The invention can run from servers within or outside of the united states as a cloud based tool or can run from a webserver-database located at a user's site within the United States or outside the USA.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing curriculum management services according to the present invention will be apparent to those skilled in the art. Various aspects of the invention have been described above by way of illustration, and the specific embodiments disclosed are not intended to limit the invention to the particular forms disclosed. The particular implementation of the curriculum management services may vary depending upon the particular context or application. By way of example, and not limitation, the curriculum management services described in the foregoing were principally directed to academic planning implementations; however, similar techniques may instead be applied to career planning, health services, exercise equipment, dietary planning, or financial advising, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for presenting curriculum information, comprising:

causing, by a server that includes a hardware processor, a first user interface to be presented on a display of a user device, wherein the first user interface includes a first plurality of selectable inputs that were assigned to a user based on a plurality of objectives from an objective dataset;

determining, using the hardware processor, a plurality of pathways to reach at least one of the plurality of objectives from the objective dataset and retrieving a course dataset from an institution at which the user is enrolled based on the plurality of objectives from the objective dataset;

transmitting, using the hardware processor, information relating to the plurality of pathways to the first user interface for presentation on the display of the user device, wherein the first user interface includes a second plurality of selectable inputs based on the course dataset from the institution at which the user is enrolled, and wherein each of the selectable inputs in the second plurality of selectable inputs is used to indicate a potential academic track of interest to the user;

identifying, using the hardware processor, a first group of courses in a first potential academic track related to a first of a plurality of potential careers of interest to the user and a second group of courses in a second potential academic track related to a second of the plurality of potential careers of interest to the user;

in response to identifying the first group of courses in the first potential academic track and the second group of courses in the second potential academic track, causing, using the hardware processor, a second user interface to be presented on the display of the user device, wherein the second user interface indicates the courses in the first group of courses as recommended for the first of the plurality of potential careers and indicates the courses in the second group of courses as recommended for the second of the plurality of potential careers, wherein each of the first potential academic track in a first portion of the second user interface and the second potential academic track in a second portion of the second user interface each include a plurality of course categories, and wherein each of the plurality of course categories includes an associated progress indicator and an associated completion message that indicate a progress of completing corresponding courses in a course category; and in response to receiving an updated objective dataset that includes at least completed course information, updating, using the hardware processor, the second user interface for presentation on the display of the user device, wherein the associated progress indicator for each of the plurality of course categories associated with the first potential academic track and the second potential academic track are updated based on the updated objective dataset, and wherein at least one of the associated progress indicator of one of the plurality of course categories associated with the first potential academic track and the associated progress indicator of one of the plurality of course categories associated with the second potential academic track notifies the user that the user is determined to have insufficient credits or insufficient time to complete the potential academic track.

2. The method of claim 1, wherein the method further comprises determining that the user profile corresponding to a user of a user device has been logged in, wherein user data including the user profile associated with the user of the user device is retrieved by a user module and wherein the first user interface is presented on the user device in response to determining that the user profile corresponding to the user of the user device has been logged in.

3. The method of claim 1, wherein the method further comprises generating first formatted data that converts data associated with the first group of courses in the first potential academic track related to the first of the plurality of potential careers of interest to the user and the second group of courses in the second potential academic track related to the second of the plurality of potential careers of interest to the user for presentation in user interfaces.

4. The method of claim 3, wherein the second user interface uses the first formatted data to indicate the courses in the first group of courses in the first potential academic track as recommended for the first of the plurality of potential careers and to indicate the courses in the second group of courses in the second potential academic track as recommended for the second of the plurality of potential careers.

5. The method of claim 3, wherein the method further comprises identifying an optimal academic track related to at least one of the plurality of potential careers of interest to the user, wherein the optimal academic track is different than the first potential academic track of interest to the user.

6. The method of claim 5, further comprising receiving, from a second user device associated with an academic counselor, an input, wherein the input is used to determine the optimal academic track.

7. The method of claim 5, wherein the method further comprises identifying a third group of courses required to complete the first potential academic track indicated by the user and a fourth group of courses required to complete the optimal academic track.

8. The method of claim 7, wherein the method further comprises:

determining that the optimal academic track is suggested for the user; and generating second formatted data that converts data associated with the third group of courses required to complete the first potential academic track indicated by the user and the fourth group of courses required to complete the optimal academic track for presentation in a third user interface.

9. The method of claim 8, wherein the method further comprises causing the third user interface to be presented on the display of the user device, wherein the third user interface uses the second formatted data to indicate the courses in the fourth group of courses in connection with an indicator that the optimal academic track is suggested for the user.

10. The method of claim 1, wherein the second user interface is presented in response to receiving a request to compare the first potential academic track and the second potential academic track.

11. The method of claim 1, wherein the second user interface indicates courses of the first group of courses and the second group of courses that have not yet been completed by the user.

12. The method of claim 1, wherein the first group of courses and the second group of courses presented in the second user interface are grouped by categories, wherein each category corresponds to an academic subject.

13. The method of claim 1, wherein the first portion of the second user interface includes a first progress indicator that indicates a current state of the user toward completion of all courses associated with the first potential academic track, and wherein the second portion of the second user interface includes a second progress indicator that includes a current state of the user toward completion of all courses associated with the second potential academic track.

14. A system for presenting curriculum information, the system comprising:

a memory; and a hardware processor that, when executing computer executable instructions stored in the memory, is configured to:

cause, by a server, a first user interface to be presented on a display of a user device, wherein the first user interface includes a first plurality of selectable inputs that were assigned to a user based on a plurality of objectives from an objective dataset;

determine a plurality of pathways to reach at least one of the plurality of objectives from the objective dataset and retrieving a course dataset from an institution at which the user is enrolled based on the plurality of objectives from the objective dataset;

transmit information relating to the plurality of pathways to the first user interface for presentation on the display of the user device, wherein the first user interface includes a second plurality of selectable inputs based on the course dataset from the institution at which the user is enrolled, and wherein each of the selectable inputs in the second plurality of selectable inputs is used to indicate a potential academic track of interest to the user;

identify a first group of courses in a first potential academic track related to a first of a plurality of potential careers of interest to the user and a second group of courses in a second potential academic track related to a second of the plurality of potential careers of interest to the user;

in response to identifying the first group of courses in the first potential academic track and the second group of courses in the second potential academic track, cause a second user interface to be presented on the display of the user device, wherein the second user interface indicates the courses in the first group of courses as recommended for the first of the plurality of potential careers and indicates the courses in the second group of courses as recommended for the second of the plurality of potential careers, wherein each of the first potential academic track in a first portion of the second user interface and the second potential academic track in a second portion of the second user interface each include a plurality of course categories, and wherein each of the plurality of course categories includes an associated progress indicator and an associated completion message that indicate a progress of completing corresponding courses in a course category; and in response to receiving an updated objective dataset that includes at least completed course information, update the second user interface for presentation on the display of the user device, wherein the associated progress indicator for each of the plurality of course categories associated with the first potential academic track and the second potential academic track are updated based on the updated objective dataset, and wherein at least one of the associated progress indicator of one of the plurality of course categories associated with the first potential academic track and the associated progress indicator of one of the plurality of course categories associated with the second potential academic track notifies the user that the user is determined to have insufficient credits or insufficient time to complete the potential academic track.

15. A non-transitory computer-readable medium containing computer-executable instructions that, when executed by a processor, cause the processor to perform a method for presenting curriculum information, the method comprising:

causing, by a server, a first user interface to be presented on a display of a user device, wherein the first user interface includes a first plurality of selectable inputs that were assigned to a user based on a plurality of objectives from an objective dataset;

determining a plurality of pathways to reach at least one of the plurality of objectives from the objective dataset and retrieving a course dataset from an institution at which the user is enrolled based on the plurality of objectives from the objective dataset;

transmitting information relating to the plurality of pathways to the first user interface for presentation on the display of the user device, wherein the first user interface includes a second plurality of selectable inputs based on the course dataset from the institution at which the user is enrolled, and wherein each of the selectable inputs in the second plurality of selectable inputs is used to indicate a potential academic track of interest to the user;

identifying a first group of courses in a first potential academic track related to a first of a plurality of potential careers of interest to the user and a second group of courses in a second potential academic track related to a second of the plurality of potential careers of interest to the user;

in response to identifying the first group of courses in the first potential academic track and the second group of courses in the second potential academic track, causing a second user interface to be presented on the display of the user device, wherein the second user interface indicates the courses in the first group of courses as recommended for the first of the plurality of potential careers and indicates the courses in the second group of courses as recommended for the second of the plurality of potential careers, wherein each of the first potential academic track in a first portion of the second user interface and the second potential academic track in a second portion of the second user interface each include a plurality of course categories, and wherein each of the plurality of course categories includes an associated progress indicator and an associated completion message that indicate a progress of completing corresponding courses in a course category; and in response to receiving an updated objective dataset that includes at least completed course information, updating the second user interface for presentation on the display of the user device, wherein the associated progress indicator for each of the plurality of course categories associated with the first potential academic track and the second potential academic track are updated based on the updated objective dataset, and wherein at least one of the associated progress indicator of one of the plurality of course categories associated with the first potential academic track and the associated progress indicator of one of the plurality of course categories associated with the second potential academic track notifies the user that the user is determined to have insufficient credits or insufficient time to complete the potential academic track.

* * * * *